(12) United States Patent
Kugemoto

(10) Patent No.: US 7,407,004 B2
(45) Date of Patent: Aug. 5, 2008

(54) STRUCTURE UTILIZING GEOTHERMAL ENERGY

(76) Inventor: Kenji Kugemoto, 1568-1 Kou, Ooaza Nakasanna, Numakuma-chou, Numakuma-gun, Hiroshima (JP) 720-0402

( * ) Notice: Subject to any disclaimer, the term of this patent is extended or adjusted under 35 U.S.C. 154(b) by 266 days.

(21) Appl. No.: 11/181,278

(22) Filed: Jul. 14, 2005

(65) Prior Publication Data

US 2005/0247431 A1    Nov. 10, 2005

Related U.S. Application Data

(62) Division of application No. 10/381,905, filed as application No. PCT/JP01/08544 on Sep. 28, 2001, now abandoned.

(30) Foreign Application Priority Data

Sep. 29, 2000  (JP) .............................. 2000-338327

(51) Int. Cl.
*E02D 5/08* (2006.01)
(52) U.S. Cl. .................................... 165/451; 52/169.11
(58) Field of Classification Search .............. 52/169.11
See application file for complete search history.

(56) References Cited

U.S. PATENT DOCUMENTS

| | | | |
|---|---|---|---|
| 2,743,602 A | 5/1956 | Dunn | |
| 3,527,921 A | 9/1970 | Voglesonger | |
| 4,075,799 A | 2/1978 | Lemelson | |
| 4,270,321 A | 6/1981 | Fisher | |
| 4,271,648 A | 6/1981 | Johnson | |
| 4,335,548 A | 6/1982 | Rehbein | |
| 4,580,487 A | 4/1986 | Sosnowski | |
| 4,757,651 A | 7/1988 | Crites | |
| 5,233,801 A | 8/1993 | Wolff | |

FOREIGN PATENT DOCUMENTS

| | | |
|---|---|---|
| JP | 5-47111 | 6/1993 |
| JP | 5-296500 | 11/1993 |
| JP | 7-310329 | 11/1995 |
| JP | 9-203068 | 8/1997 |
| JP | 11-036321 | 2/1999 |

*Primary Examiner*—Allen J. Flanigan
(74) *Attorney, Agent, or Firm*—William L. Androlia; H. Henry Koda

(57) ABSTRACT

A structure utilizing geothermal energy capable of effectively utilizing a thermal energy in an underground constant temperature layer while using a supplementary heater and an air conditioner and natural energies such as solar heat or solar light, wind power, and water power in order to prevent limited fossil energies such as petroleum, gases, and coal from being exhausted, wherein an insulating wall (A) formed of a plurality of insulation panels (1) connected to each other and extending from a ground surface (4) to the underground constant temperature layer (21) is buried in the ground while surrounding a building (22) adhesively to the ground exposed portion and the underground buried portion of a foundation (5).

6 Claims, 27 Drawing Sheets

US 7,407,004 B2

STRUCTURE UTILIZING GEOTHERMAL ENERGY

TECHNICAL FIELD

The present invention relates to a structure utilizing geothermal energy, utilizing geothermal energy for cooling and warming a building or the like.

BACKGROUND ART

In many modes of the related art of utilizing the geothermal energy, for example, a heat exchanging duct or pipe using air or water as a heat transfer medium is extended from a basement, an underground buried pipe or the like into a building so that the heat transfer medium warmed or cooled in the ground is circulated in the building for the air-conditioning purposes or so that a motive power is extracted by an equipment to be actuated by the heat exchanges. Alternatively, an underground constant temperature layer (or an underground portion laid in selected depth with constant temperature throughout a year) at a low temperature is utilized so that the geothermal energy is utilized by storing food or the like in a cave reaching the underground constant temperature layer, by storing goods in a hole and by covering or burying the goods in the ground, or the like.

The underground temperature change is caused within the range of a constant depth from the ground surface mainly by the irradiation of the solar heat. The ground deeper than the aforementioned constant depth is an underground constant temperature layer, in which the temperature hardly changes among the seasons, and the thermal energy rises the higher as the layer becomes the deeper. The constant depth from the ground surface, i.e., the underground constant temperature layer takes a lower temperature in summer than that of the ground surface and a higher temperature in winter than that of the ground surface. This thermal energy of the underground constant temperature layer can be utilized for the cooling purpose in summer and for the warming purpose in winter, if it is introduced into a building. And, the thermal energy in the aforementioned underground constant temperature layer is in fact an inexhaustible natural energy and is advantageous over other natural energies (e.g., a solar heat or solar light, wind power or water power) in that it is stable and usable (for introducing the thermal energy easily because it is present just under the building). The aforementioned example of utilizing the geothermal energy notes that advantage, but it cannot be said that the geothermal energy is sufficiently utilized. Therefore, means for effectively utilizing the thermal energy in the underground constant temperature layer are studied while using a supplementary device such as a heater or an air conditioner, or while using natural energies such as solar heat, solar light, wind power, or water power, in order to prevent limited fossil energies such as petroleum, gases, and coal from being exhausted.

DISCLOSURE OF INVENTION

As a result of the studies, there is developed a structure utilizing geothermal energy comprising an insulating wall extending from the ground surface to an underground constant temperature layer and buried in the ground while surrounding a building. Specifically, the insulating wall is buried extending integrally and continuously from the outer wall of the building to surround the building foundation. In this case, (a) the insulating wall may be buried in close contact with outer side faces of the ground exposed portion and the underground buried portion of the building foundation, or (b) the insulating wall may be buried at a location spaced from the outer side face of the ground exposed portion or the outer side face of the underground buried portion of the building foundation. In case the insulating wall is buried at a location spaced from the outer side face of the ground exposed portion of the building foundation, a closed space is formed at a location between the upper portion of the insulating wall protruding from the ground surface and the building foundation. It is, therefore, advisable that an inner ventilator is mounted in the ground exposed portion or in the wall of the building for providing the communicative connection between the closed space mentioned above and the building interior, and that an outer ventilator is mounted in the insulating wall for providing the communicative connection between the closed space and the outside of the structure. For example, each of the inner and outer ventilators may be provided with a ventilating fan, or a heat exchanging duct may also be arranged to provide the communicative connection between the inner and outer ventilators.

In the present invention, according to the temperature distribution of the ground in the depth direction, a building is surrounded on its four sides with the insulating wall which is buried as deeply as the underground constant temperature layer having stable temperature fluctuations, so that the heat exchanging range between the interior of the building and the ground below the building is limited to the region just under the building, thereby to suppress such useless heat exchanges as might otherwise cause the temperature change in the building. In summer, the insulating wall blocks the heat exchanges, in which the thermal energy by the solar heat irradiating the ground around the building, especially the ground surface around the building is taken through the ground from the building foundation into the building, so that the ground just under the building may be held at a lower temperature than that of the building, thereby to enhance the cooling effect of the building interior. In winter, on the other hand, the insulating wall prevents the warming thermal energy from dissipating through the building foundation into the ground around building thereby to enhance the warming effect of the building interior.

Table 1 shows the temperature distributions of the individual districts of Japan in January (winter) and July (summer) within a range from the ground surface (of 0.0 m depth) to the underground constant temperature layer (of 3.0 m depth). FIG. 53 shows the underground temperature distribution of Hiroshima in winter, and FIG. 54 shows the underground temperature distribution of Hiroshima in summer. In the average temperature (in a thick row in Table 1) at Hiroshima in winter January, as seen from Table 1 and FIG. 53: a ground surface 39 takes 5.0° C.; a 1 m depth layer 40 takes 7.4° C.; a 2 m depth layer 41 takes 13.9° C.; and a 3 m depth layer (=the underground constant temperature layer) 42 takes 16.0° C., which is higher by 11.0° C. than that of the ground surface 39. However, an under-floor area 47 having active heat exchanges with the outside air takes 2.3° C., which is lower than that of the ground surface. In the average temperature (in a thick row in Table 1) at Hiroshima in summer July, as seen from Table 1 and FIG. 54: a ground surface 43 takes 29.6° C.; a 1 m depth layer 44 takes 25.4° C.; a 2 m depth layer 45 takes 19.5° C.; and a 3 m depth layer (=the underground constant temperature layer) 46 takes 17.3° C., which is lower by 12.3° C. than that of the ground surface 43. In summer, too, an under-floor area 49 having active heat exchanges takes 24.3° C., which is made considerably high, although shaded, by the heat radiation from the ground surface 43.

TABLE 1

Surface and Ground Temperature (° C.) Distribution
Statistical Years (1886-1945)

| Districts | Average Temperature of January Depth | | | | | Average Temperature of July Depth | | | | |
|---|---|---|---|---|---|---|---|---|---|---|
| | 0.0 m | 0.5 m | 1.0 m | 2.0 m | 3.0 m | 0.0 m | 0.5 m | 1.0 m | 2.0 m | 3.0 m |
| Kagoshima | 7.1 | 10.8 | 14.2 | 17.9 | 19.1 | 29.7 | 26.0 | 22.7 | 18.9 | 17.4 |
| Fukuoka | 5.7 | 8.9 | 11.3 | 15.1 | 18.3 | 28.3 | 25.3 | 23.1 | 18.8 | 18.4 |
| Kochi | 5.6 | 8.4 | 12.9 | 16.7 | 18.7 | 28.8 | 26.2 | 23.1 | 19.9 | 17.9 |
| Hiroshima | 5.0 | 7.5 | 7.4 | 13.9 | 16.0 | 29.6 | 25.7 | 25.4 | 19.5 | 17.3 |
| Kanazawa | 2.2 | 5.4 | 7.8 | 12.0 | 14.2 | 27.6 | 23.4 | 20.3 | 15.7 | 13.5 |
| Osaka | 3.9 | 6.9 | 9.3 | 13.4 | 15.8 | 29.7 | 25.8 | 23.4 | 19.1 | 16.7 |
| Nagoya | 4.9 | 6.6 | 9.4 | 12.7 | 14.8 | 29.4 | 26.4 | 23.9 | 20.0 | 18.1 |
| Tokyo | 2.6 | 5.5 | 8.7 | 13.1 | 15.2 | 27.4 | 23.9 | 21.3 | 20.4 | 15.6 |
| Sendai, | 0.4 | 4.4 | 7.3 | 10.5 | 12.9 | 24.1 | 20.8 | 18.3 | 15.2 | 13.3 |
| Morioka | 0.4 | 3.1 | 6.1 | 10.8 | 12.6 | 23.5 | 20.1 | 16.8 | 12.2 | 10.6 |
| Sapporo | — | 2.1 | 5.0 | 8.4 | 9.7 | 22.4 | 17.5 | 13.7 | 9.7 | 8.4 |

Data: [Japanese Weather Table by Districts]
Edited by Central Meteorological Observatory, May, 1950

In all the individual districts, as apparent from Table 1, the underground temperatures of summer and winter are substantially equal in the vicinity of a depth of 2 to 3 m. Although different according to the kinds of soil and the surrounding environments, the layer of a depth of 2 to 3 m can be deemed as the underground constant temperature layer. In other words, a shallower ground and the ground surface are affected by the temperature change of the surrounding ground, especially by the heat exchanges from the ground surface which is subjected to the influences of the outside air. Therefore, the aforementioned heat exchanges of the ground surface, as is not exposed to the solar light, just under the building are prevented to suppress the temperature change in the layer over the underground constant temperature layer, i.e., the layer from the ground surface to the underground constant temperature layer.

The building, to which the present invention can be applied: (1) may be constructed such that the bottom face of the building contacts directly with the ground surface in the area surrounded by the insulating wall; (2) may be filled with rubbles between the bottom face of the building and the ground surface in the area surrounded by the insulating wall; (3) may be constructed such that a mat foundation extending partially or wholly from the bottom face of the building contacts directly with the ground surface in the area surrounded by the insulating wall; and (4) may be filled with rubbles between a mat foundation extending partially or wholly from the bottom face of the building and the ground surface in the area surrounded by the insulating wall. Thus, the blocking of the heat exchanges according to the present invention between the building interior and the ground surface around the building is realized by the insulating wall around the building so that the present invention can be applied to any types of the portion of the building foundation.

The insulating wall characterizing the present invention is based on (A) that the insulating wall is constructed of insulation panels made of a synthetic resin. Specifically, the insulating wall is constructed by connecting a plurality of insulation panels adhesively to each other, and the individual insulation panels of a synthetic resin are constructed to have a fitting ridge on one of the abutting edges to be adhesively connected to each other and a fitting groove in the other abutting edge. These insulation panels made of a synthetic resin may have moisture permeable holes for providing the communicative connection between the inside and the outside of the insulating wall. Generally, the insulation panels are inferior in the air permeability or moisture permeability, and the water drainage just under the building may be deteriorated if the building is surrounded by the insulation panels. It is, therefore, advisable that the insulation panels are provided with the moisture permeable holes. In addition, (B) the insulating wall may also be constructed by connecting hollow pipes made of a synthetic resin or a metal in close contact to each other. These hollow pipes made of a synthetic resin or a metal may also have moisture permeable holes for providing the communicative connection between the inside and the outside of the insulating wall. In case the insulating wall is constructed by arranging a plurality of pipes inward or outward of the building, the moisture permeable holes of the individual pipes need not to be provided as straight communicative connections. Even if the moisture permeable holes of the individual pipes are staggered, it is sufficient that the insulating wall can exhibit the air permeability or moisture permeability in its entirety.

BEST MODE FOR CARRYING OUT THE INVENTION

The present invention will be described in detail in connection with embodiments shown in the drawings.

In individual Figures, moreover: Numeral 1 means Insulation Panel; Numeral 2 means Moisture Permeable Holes; Numeral 3 means Ground; Numeral 4 means Ground Surface; Numeral 5 means Building Foundation; Numeral 6 means Sills; Numeral 7 means Pillars; Numeral 8 means Inner Wall; Numeral 9 means Outer Wall; Numeral 10 means Water Drip; Numeral 11 means Closed Space; Numeral 12 means Under-floor Area; Numeral 13 means Steel Frame; Numeral 14 means Earth Floor; Numeral 15 means Vinyl House; Numeral 16 means Ridges; Numeral 17 means Floor; Numeral 18 means Interior; Numeral 19 means Layer of 1 M Depth; Numeral 20 means Layer of 2 M Depth; Numeral 21 means Layer of 3 M Depth (Underground Constant Temperature Layer); Numeral 22 means Building; Numeral 23 means Roof; Numeral 24 means Ceiling; Numeral 25 means House Interior; Numeral 26 means Outside Air; Numeral 27 means Building Wall; Numeral 28 means Air Cleaner; Numeral 29 means Ventilator; Numeral 30 means Duct; Numeral 31 means Heat Transfer Medium; Numeral 32 means Building Foundation Concrete; Numeral 33 means Rubbles; Numeral 34 means Moisture Proof Sheet; Numeral 35 means Upper Insulation Panel; Numeral 36 means Hollow Pipes; Numeral 37 means Upper Portion of the Building; Numeral 38 means Basement; Numeral 39 means Ground Surface (5.0° C.); Numeral 40 means Layer (7.4° C.) of 1 M Depth; Numeral 41 means Layer (13.9° C.) of 2 M Depth; Numeral 42 means Layer (16.0° C., Underground Constant Temperature Layer) of 3 M Depth; Numeral 43 means Ground Surface (29.6° C.); Numeral 44 means Layer (25.4° C.) of 1 M Depth; Numeral 45 means Layer (19.5° C.) of 2 M Depth; Numeral 46 means Layer (17.3° C., Underground Constant Temperature Layer) of 3 M Depth; Numeral 47 means Under-floor Area (2.3° C.); Numeral 49 means Under-floor Area (24.3° C.); Numeral 50 means Fitting Ridge; Numeral 51 means Fitting Groove; Numeral 52 means Underground Beams; and Letter A means Insulating Wall.

Figure 1:
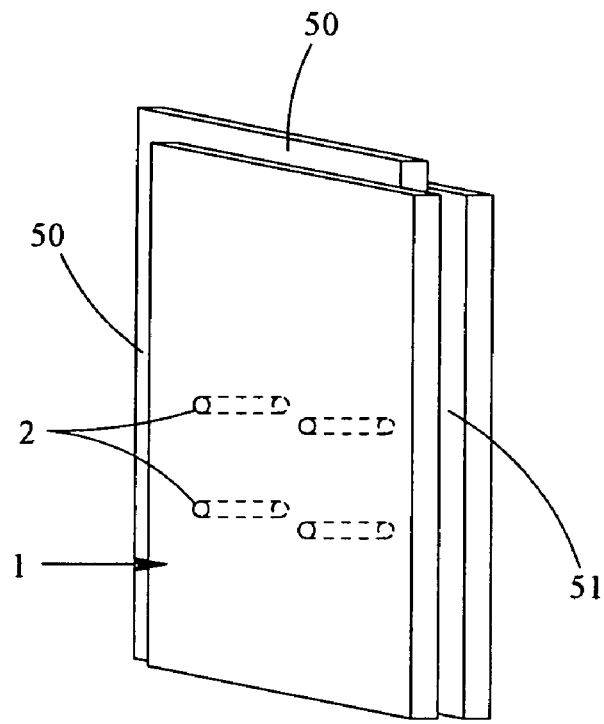
FIG. 1 is a perspective view showing an insulation panel to be used in the present invention.
Figure 2:
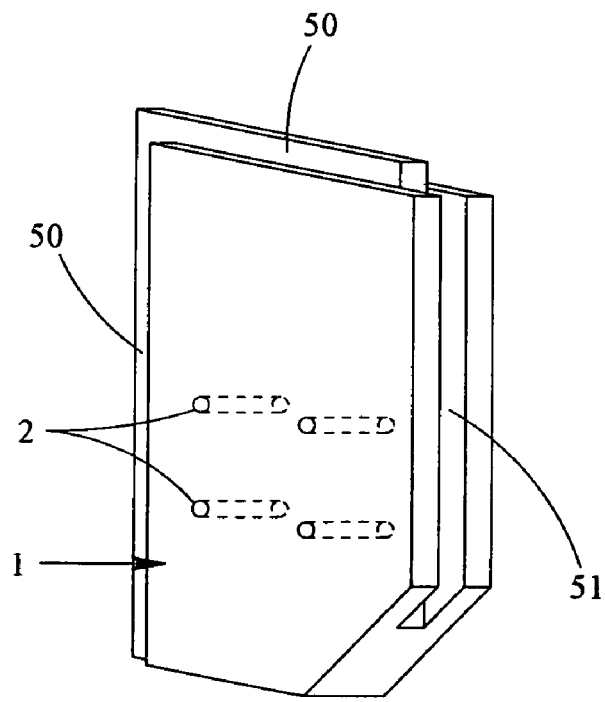
FIG. 2 is a perspective view showing an insulating panel of another example.
Figure 3:
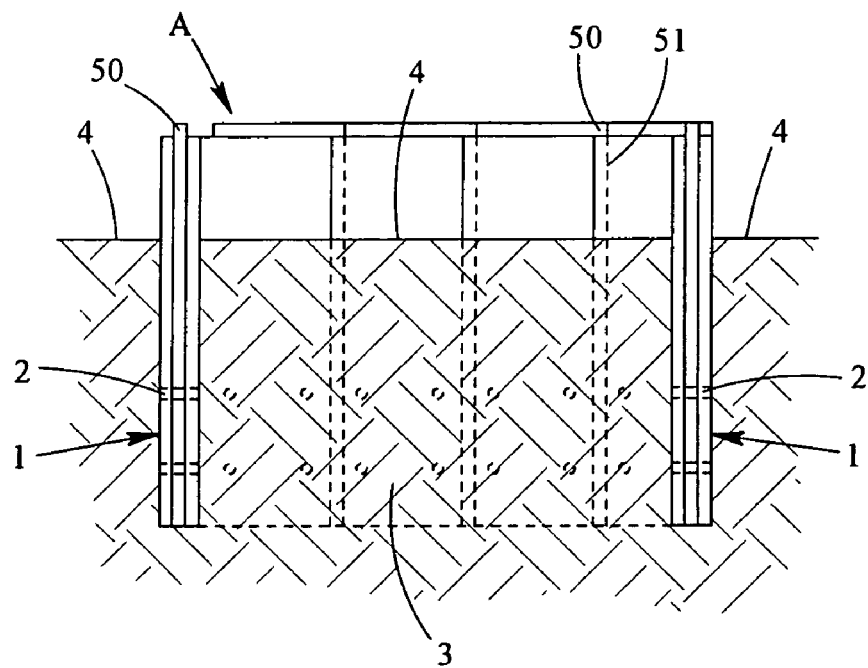
FIG. 3 is a sectional view showing the state, in which an insulating wall is constructed by burying insulation panels.
Figure 4:
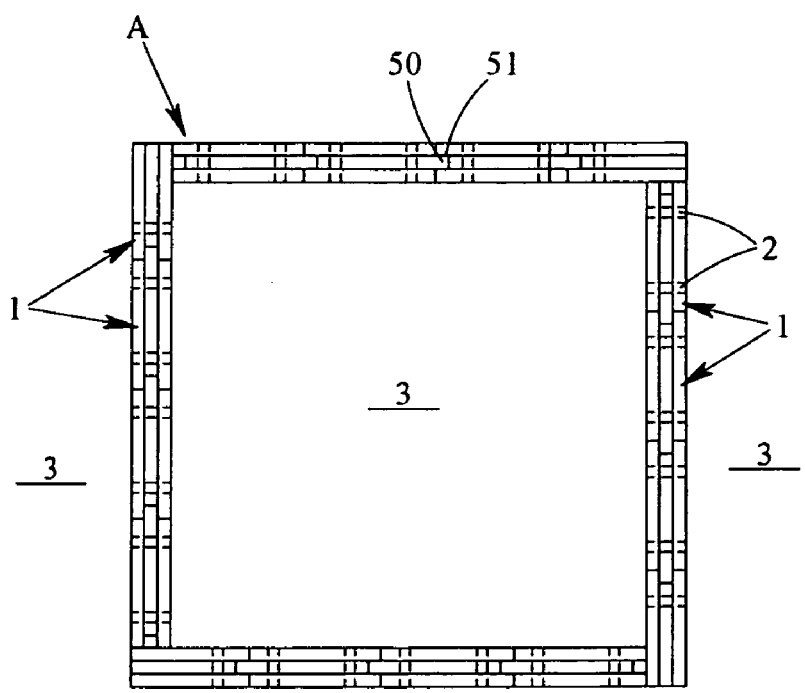
FIG. 4 is a top plan view showing the state, in which the insulating wall is constructed by burying the insulation panels.

In the present invention, insulation panels 1 of an synthetic resin, as shown in FIG. 1 and FIG. 2, are used to construct an insulating wall A, as shown in FIG. 3 and FIG. 4. The insulation panels 1, as exemplified in FIG. 1 and FIG. 2, are made of a synthetic resin and have such a height as can be buried deeply into the ground 3 from the ground surface 4. Each insulation panel 1 is provided with a fitting ridge 50 on its left side edge (as located on the depth side of FIG. 1) and on its upper edge, and with a fitting groove 51 on the right side edge (as located on this side of FIG. 1). The insulation panels 1 and 1, as juxtaposed, are fitted in and connected to each other. Moreover, the insulation panel face has moisture permeable holes 2 for the communicative connection through its inside and outside. The example of FIG. 2 is cut away at its lower right corner portion from the insulation panel 1 of FIG. 1.

Figure 5:
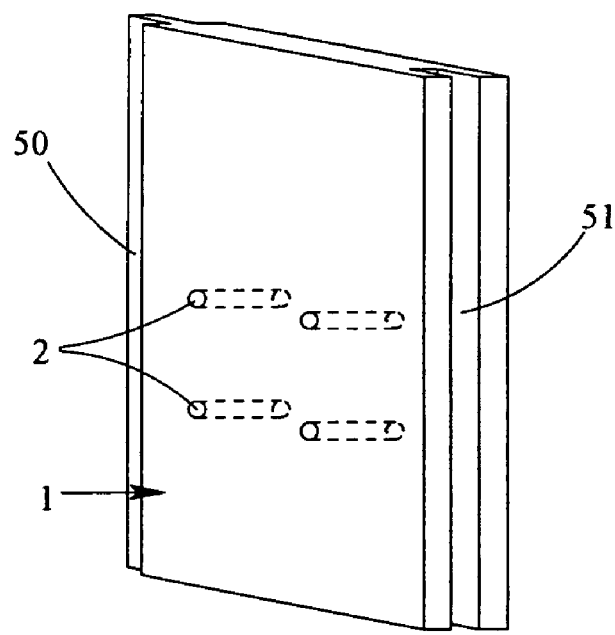
FIG. 5 is a perspective view showing an insulation panel of another example.
Figure 6:
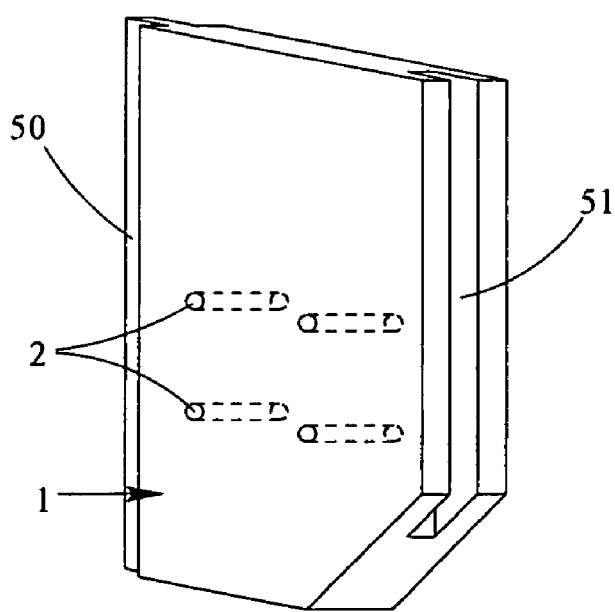
FIG. 6 is a perspective view showing an insulation panel of another example.
Figure 7:
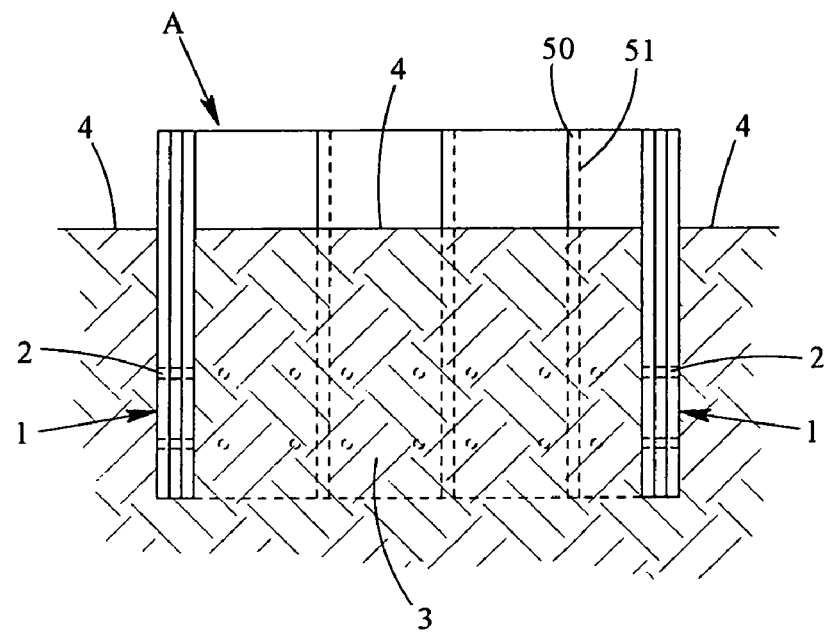
FIG. 7 is a sectional view showing the state, in which an insulating wall is constructed by burying insulation panels of another example.
Figure 8:
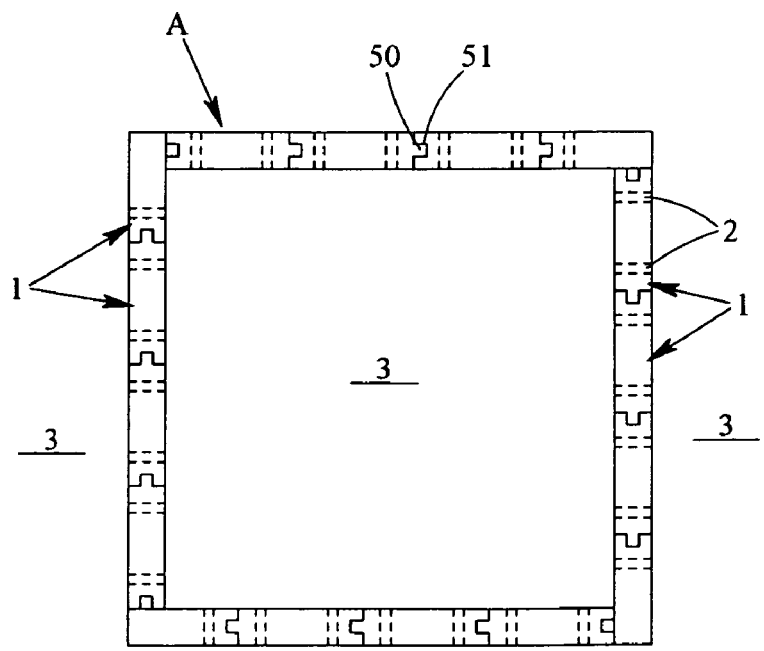
FIG. 8 is a top plan view showing the state, in which an insulating wall is constructed by burying insulation panels of another example.
Figure 9:
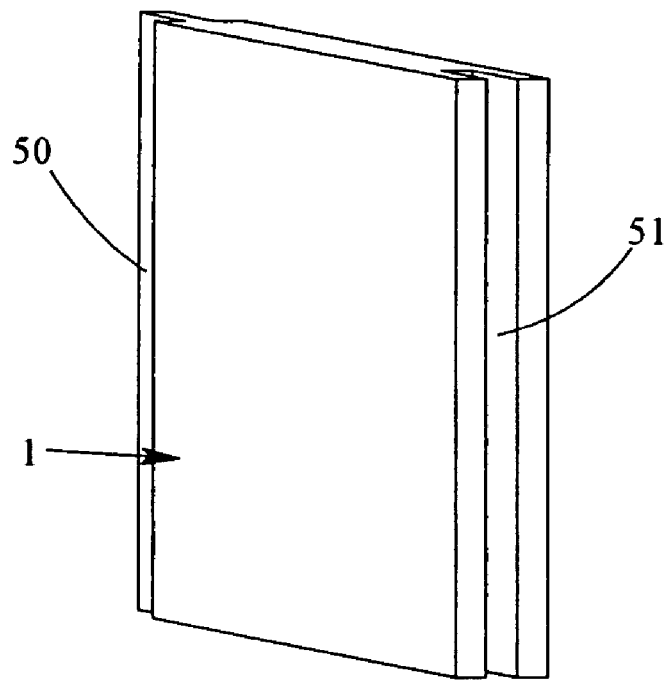
FIG. 9 is a perspective view showing an insulation panel of another example.
Figure 10:
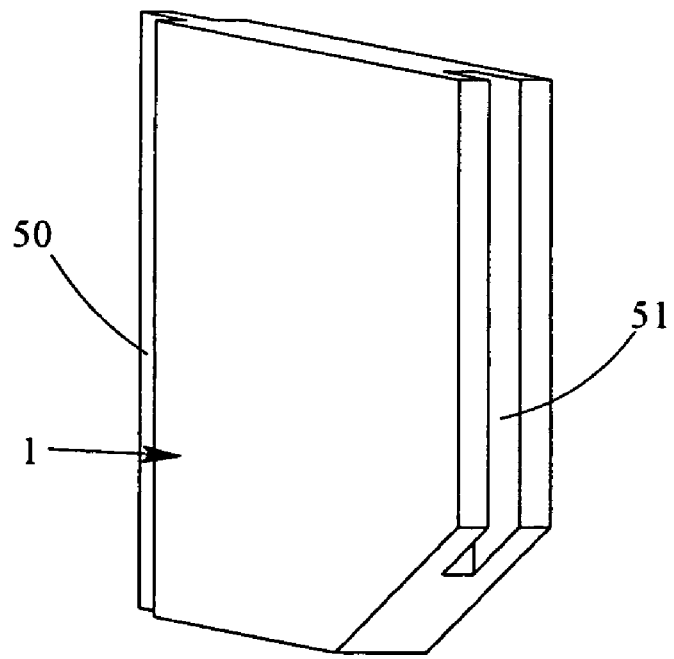
FIG. 10 is a perspective view showing an insulation panel of another example.
Figure 11:
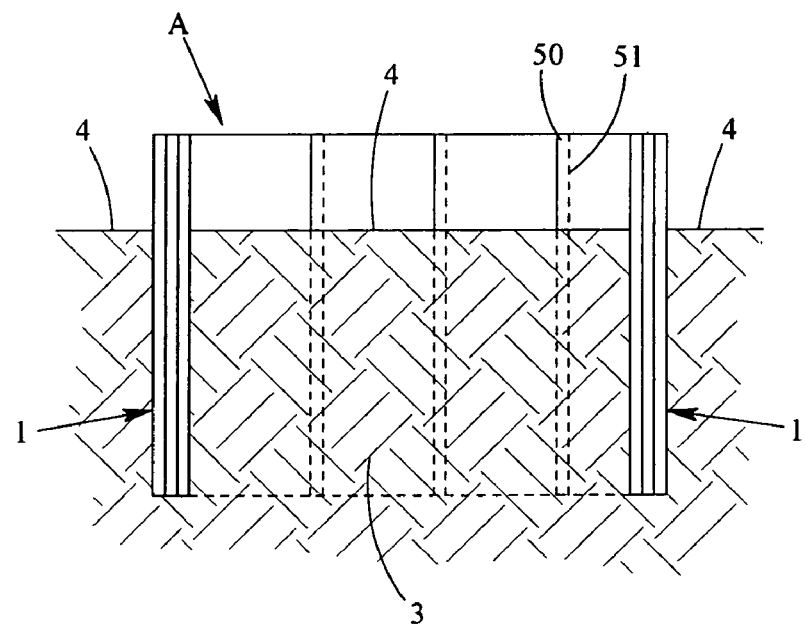
FIG. 11 is a sectional view showing the state, in which an insulating wall is constructed by burying insulation panels of another example.
Figure 12:
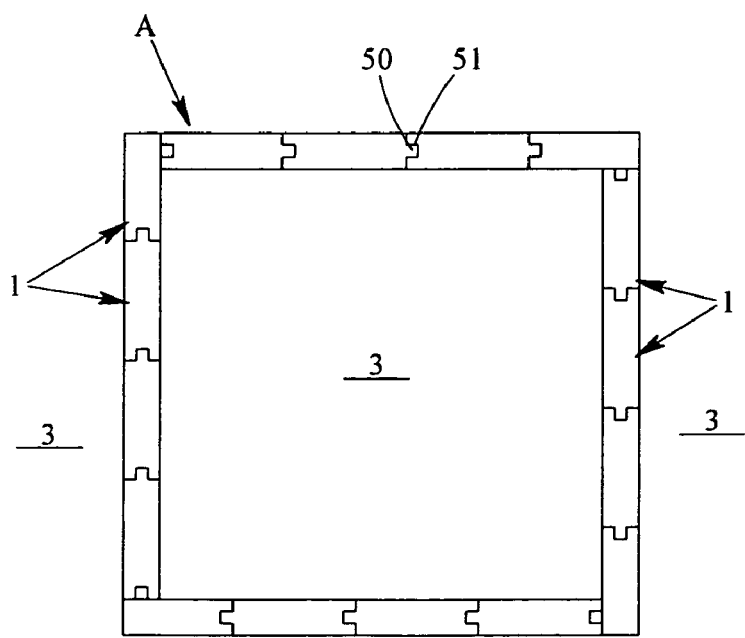
FIG. 12 is a top plan view showing the state, in which an insulating wall is constructed by burying insulation panels of another example.

It is sufficient that the insulation panels 1 can be connected to each other, and its fitting ridge and groove are not essential components. Therefore, instead of the insulation panel shown in FIG. 1 or FIG. 2, the insulation panels 1 of FIG. 5 or FIG. 6 omitting the fitting ridge on the upper edge may be used to construct the insulating wall A shown in FIG. 7 or FIG. 8. In a low humidity district, moreover, it is needless to consider the air permeability or water permeability in the ground 3. Therefore, it is sufficient that the insulation panels of FIG. 9 or FIG. 10 further omitting the moisture permeable holes from the insulation panels of FIG. 5 or FIG. 6 may be used to construct the insulating wall A shown in FIG. 11 and FIG. 12.

Here will be described the specific application of the present invention.

Figure 13:
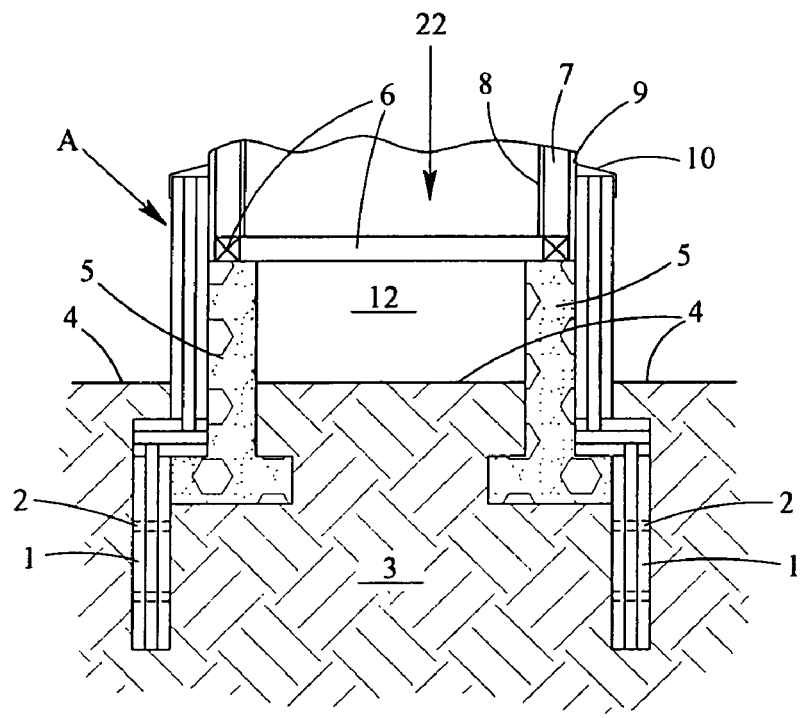
FIG. 13 is a sectional view showing the state, in which an insulating wall is constructed in close contact with the building foundation.

In the application of the present invention to a building 22, as shown in FIG. 13, the insulation panel 1 is basically buried in close contact with a building foundation (or a standard continuous building foundation having an inverted T-section) to a depth deeper than the foundation, or preferably the insulation panel 1 is extended so long as to reach an outer wall 9 thereby to construct the insulating wall A. In short, the insulating wall A is vertically extended across the ground surface 4. In this case, the insulation panels 1 having the moisture permeable holes 2 are used in the buried portion of the insulating wall A, but the insulation panels 1 of the portion of the insulating wall A over the ground need not have the moisture permeable holes 2, and the insulating wall A may be covered at its uppermost end with a water drip 10. Thus, sills 6 are mounted on the building foundation 5 within the range from the ground 3 (i.e., the underground constant temperature layer) to the ground and within the range surrounded by the insulating wall A, and the building 22 composed of pillars 7, an inner wall 8 and an outer wall 9 is erected on those sills 6. Then, the building 22, i.e., its under-floor area 12 can be spaced from the underground heat exchanges.

Figure 14:
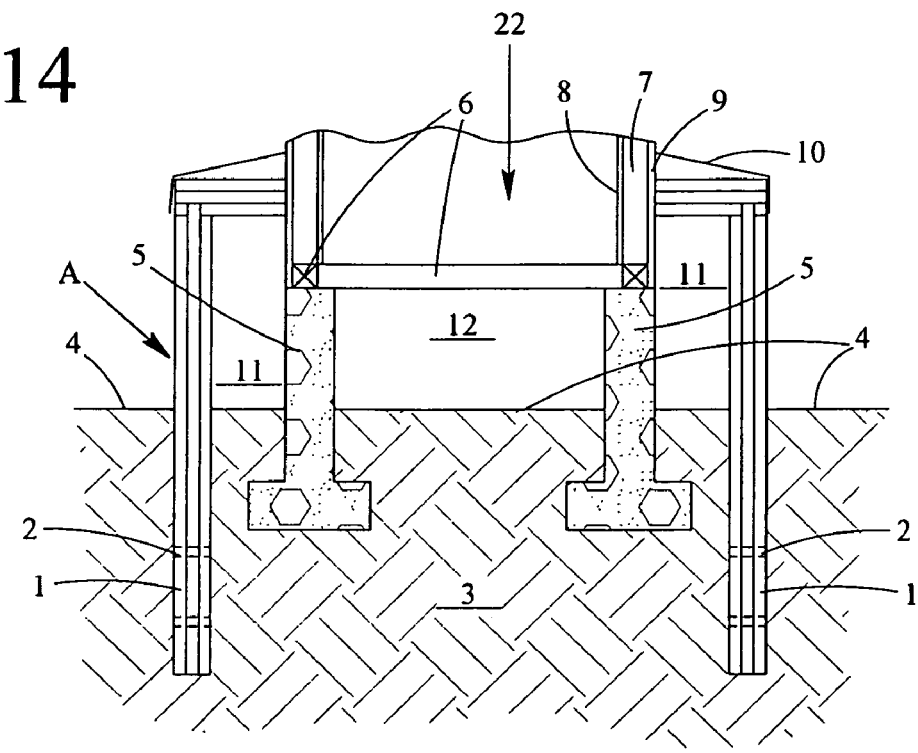
FIG. 14 is a sectional view showing the state, in which an insulating wall is constructed at a location spaced from the building foundation.
Figure 15:
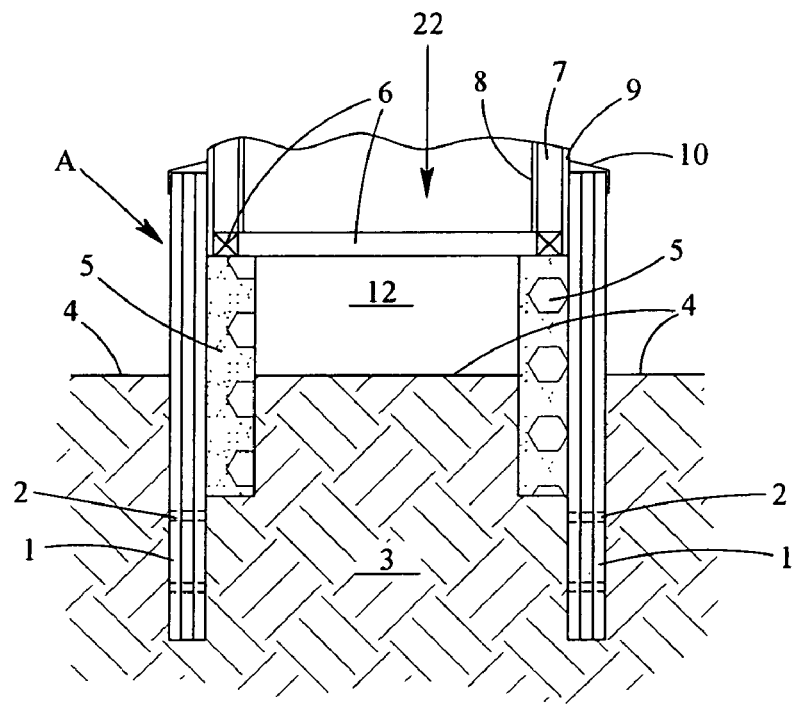
FIG. 15 is a sectional view showing the state, in which an insulating wall is constructed in close contact with the building foundation of another example.
Figure 16:
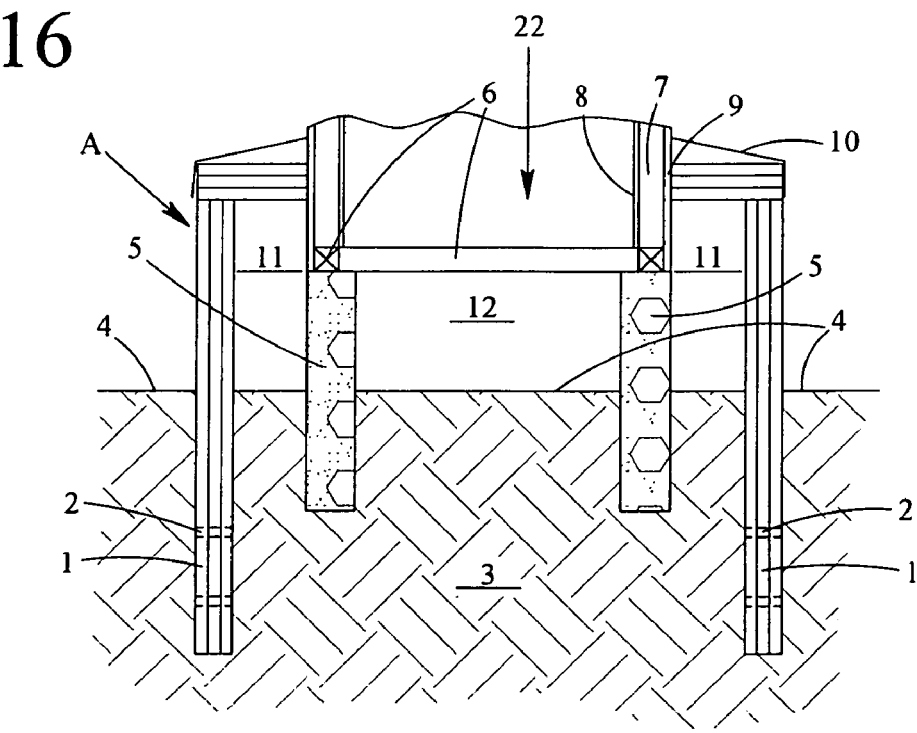
FIG. 16 is a sectional view showing the state, in which an insulating wall is constructed at a location spaced from the building foundation of another example.
Figure 17:
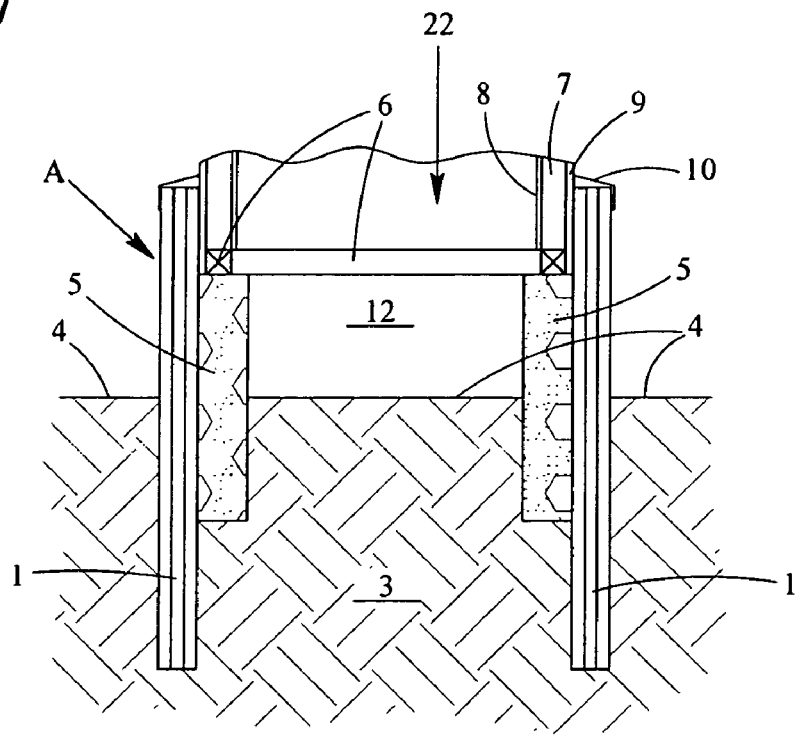
FIG. 17 is a sectional view showing the state, in which an insulating wall is constructed in close contact with the building foundation of another example.
Figure 18:
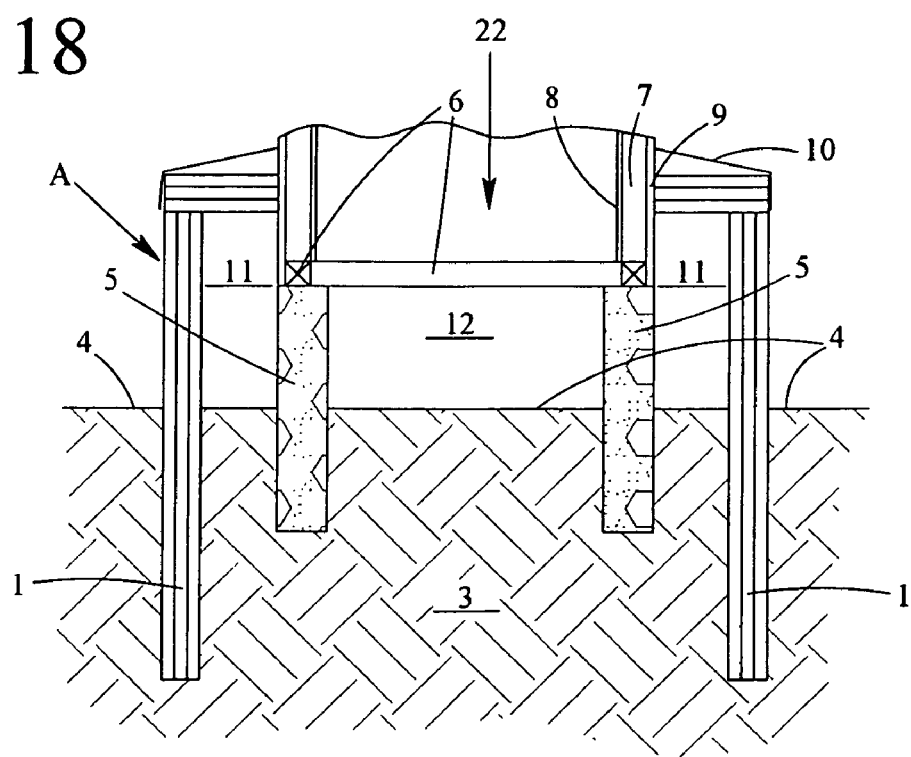
FIG. 18 is a sectional view showing the state, in which an insulating wall is constructed at a location spaced from the building foundation of another example.

When the insulation panels 1 are spaced through a closed space 11 from the building foundation 5, the insulating wall A can be constructed with the continuous single insulation panel 1 extending from the ground 3 to the ground surface 4, as shown in FIG. 14. In this case, the closed space 11 forms an air insulating layer between the insulating wall A and the building 22, and acts to enhance the actions and effects of the invention. With the continuous building foundation 5 having a straight section, moreover, the insulating wall A can be constructed of the single insulation panel 1 extending in close contact with the building foundation 5 from the ground 3 to the ground surface 4, as shown in FIG. 15. In this case, too, the insulating wall A may be constructed of the insulation panels 1 spaced from the building foundation 5 with forming the closed space 11, as shown in FIG. 16. In the less moisture place, moreover, the insulating wall A may also be constructed of the insulation panel 1 omitting the moisture permeable holes, as shown in FIG. 17 and FIG. 18.

Figure 19:
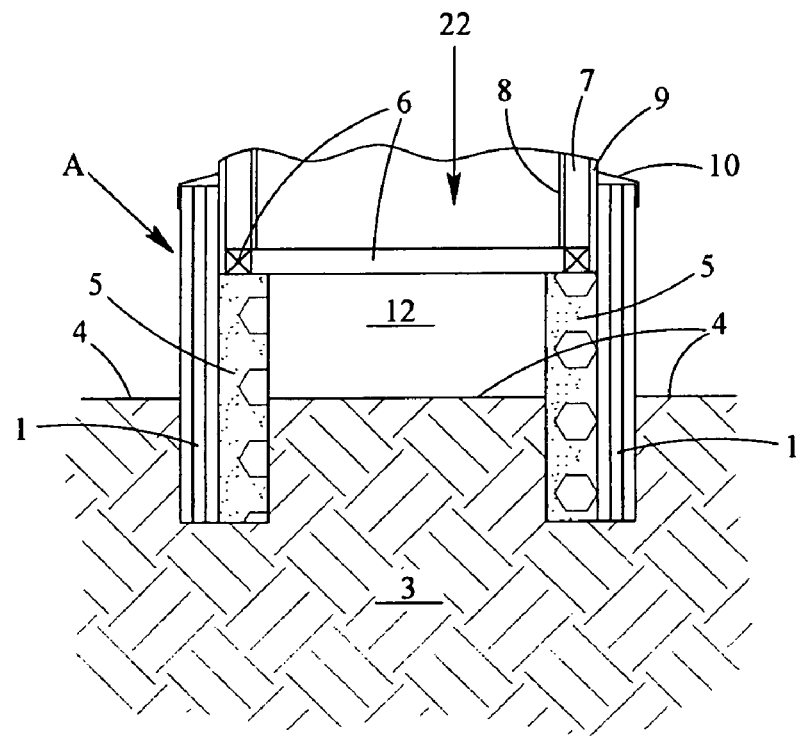
FIG. 19 is a sectional view showing the state, in which an insulating wall is constructed in close contact with the building foundation.
Figure 20:
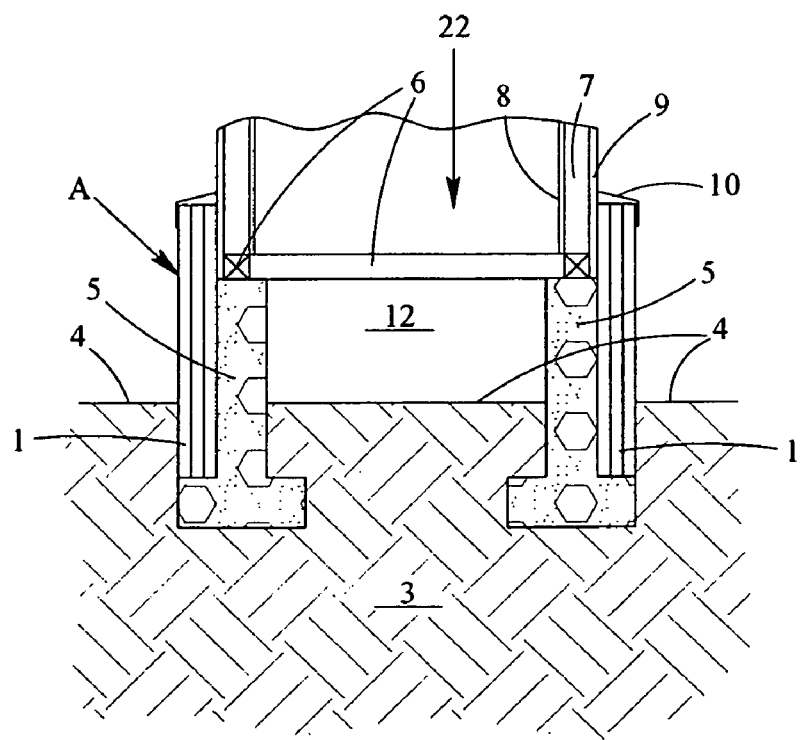
FIG. 20 is a sectional view showing the state, in which an insulating wall is constructed in close contact with the building foundation.

The present invention aims mainly at burying the insulating wall into the underground constant temperature layer or in the layer of 3 m depth. As a matter of fact, however, it is not a little case that the aforementioned depth cannot be desired, depend upon hardness of the ground. In this case, the ground 3 is excavated so deeply as the building foundation 5, as shown in FIG. 19 and FIG. 20. It is, therefore, advisable that the insulation panel 1 is brought into close contact with the building foundation 5 thereby to extend the insulating wall A to a position as deep as possible.

The invention can be applied not only to the aforementioned continuous building foundation 5 but also to another building foundations.

Figure 21:
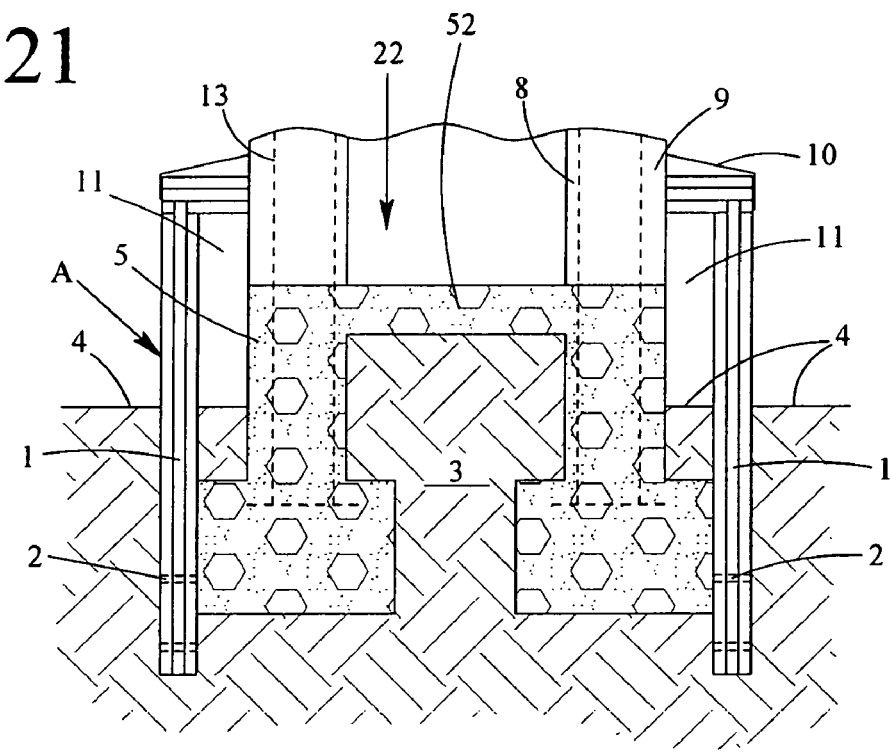
FIG. 21 is a sectional view showing the state, in which an insulating wall is constructed in close contact with a building foundation having an underground beam.
Figure 22:
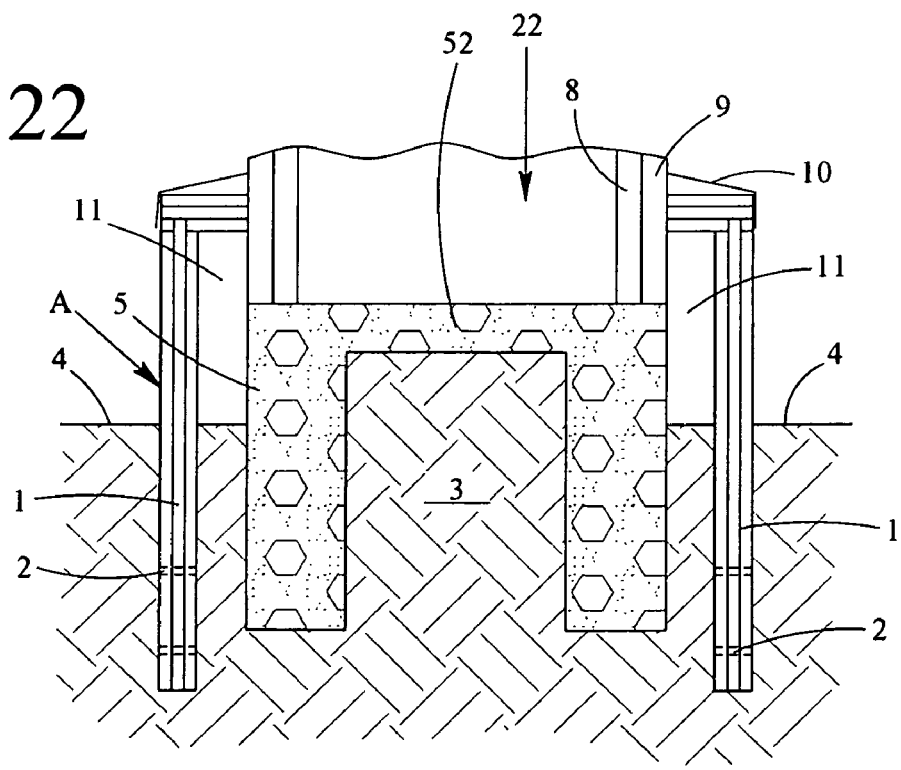
FIG. 22 is a sectional view showing the state, in which an insulating wall is constructed at a location spaced from a building foundation having an underground beam.
Figure 23:
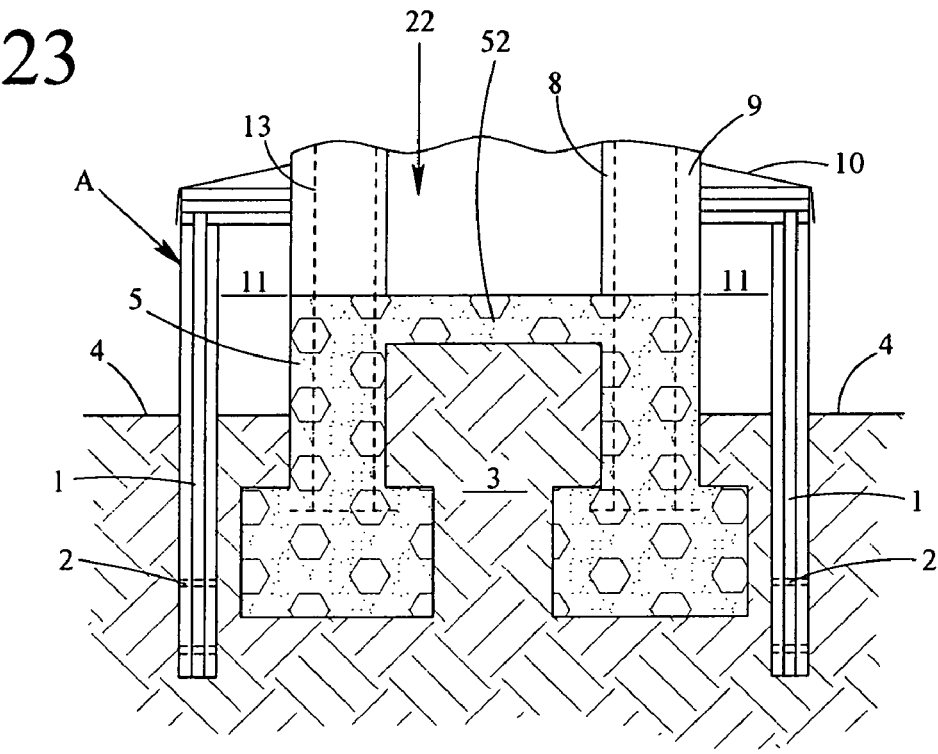
FIG. 23 is a sectional view showing the state, in which an insulating wall is constructed at a location spaced from a building foundation having an underground beam.
Figure 24:
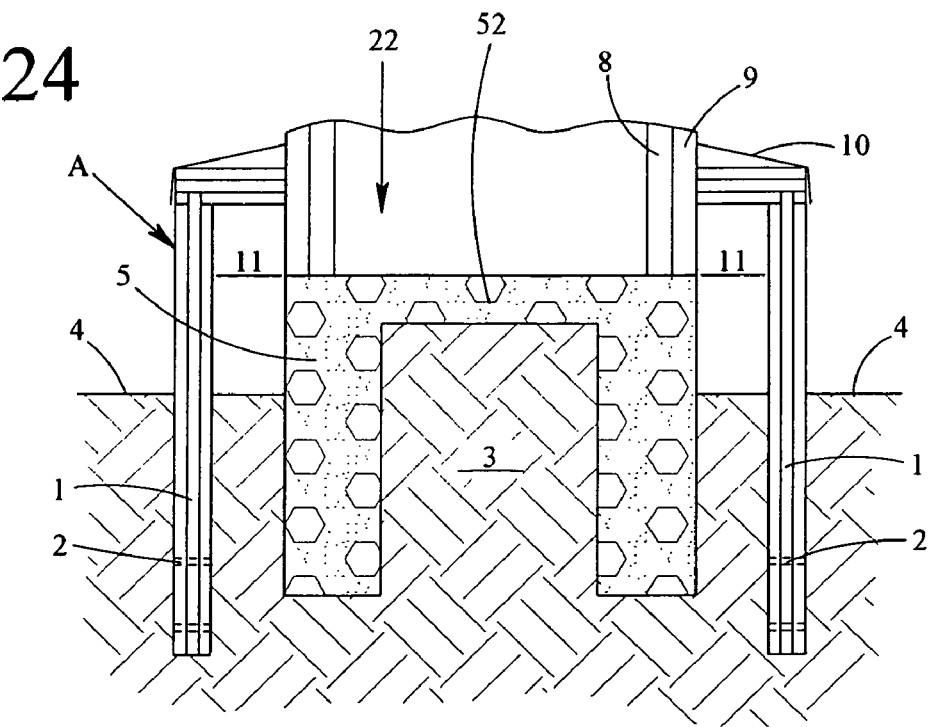
FIG. 24 is a sectional view showing the state, in which an insulating wall is constructed at a location spaced from a building foundation having an underground beam.

As shown in FIG. 21 and FIG. 22, the present invention can be likewise applied to the building foundation 5 having underground beams 52. In this case, the closed space under the underground beams 52 and in the building foundation 5 can be filled up with soil thereby to increase the stability as the building 22 and to retain the thermal integration between the building 22 and the ground 3. In this case, too, the insulating wall A can be constructed at a location spaced from the building foundation 5, as shown in FIG. 23 and FIG. 24.

Figure 25:
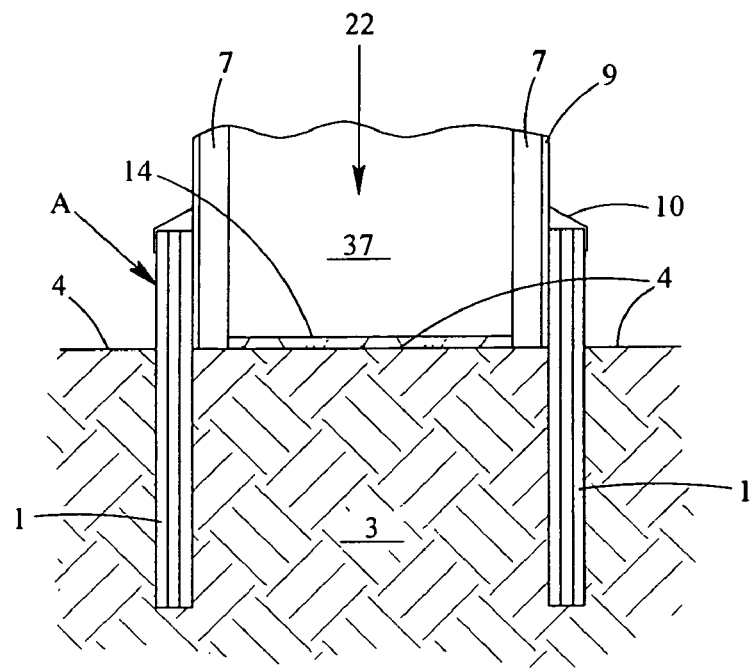
FIG. 25 is a sectional view showing the state, in which an insulating wall is constructed in close contact with a ground structure utilizing geothermal energy.
Figure 26:
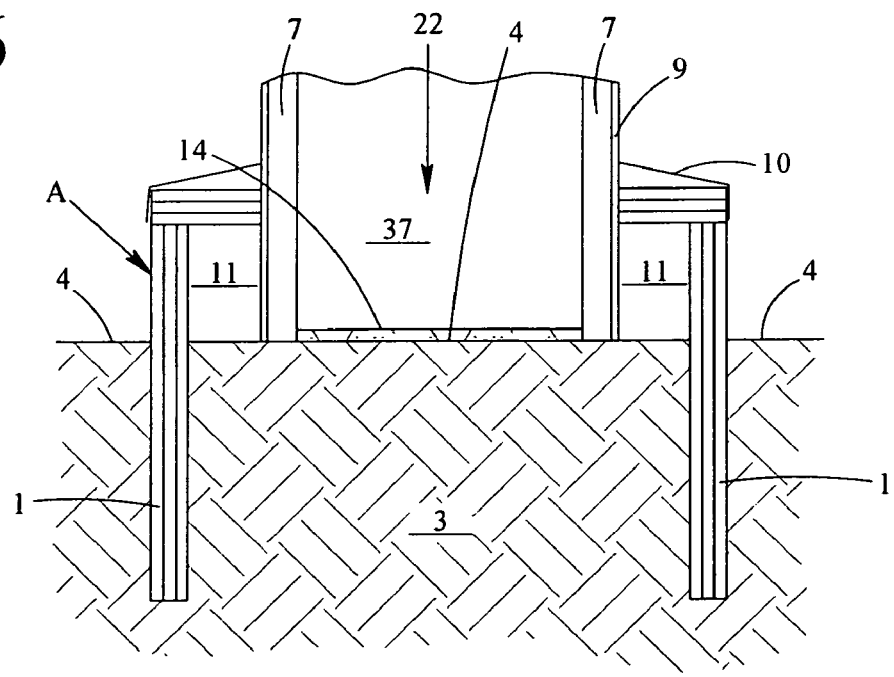
FIG. 26 is a sectional view showing the state, in which an insulating wall is constructed at a location spaced from a ground structure utilizing geothermal energy.
Figure 27:
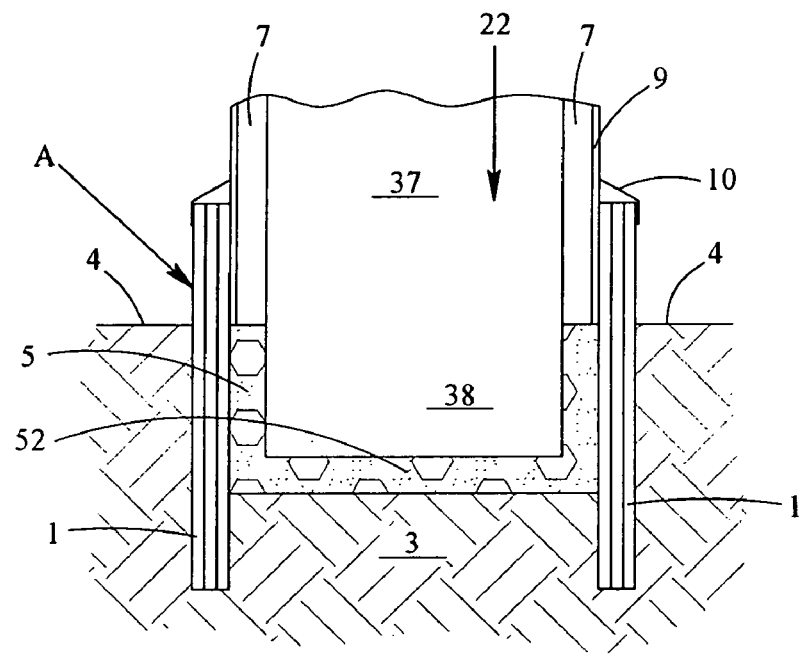
FIG. 27 is a sectional view showing the state, in which an insulating wall is constructed in close contact with an underground structure utilizing geothermal energy.
Figure 28:
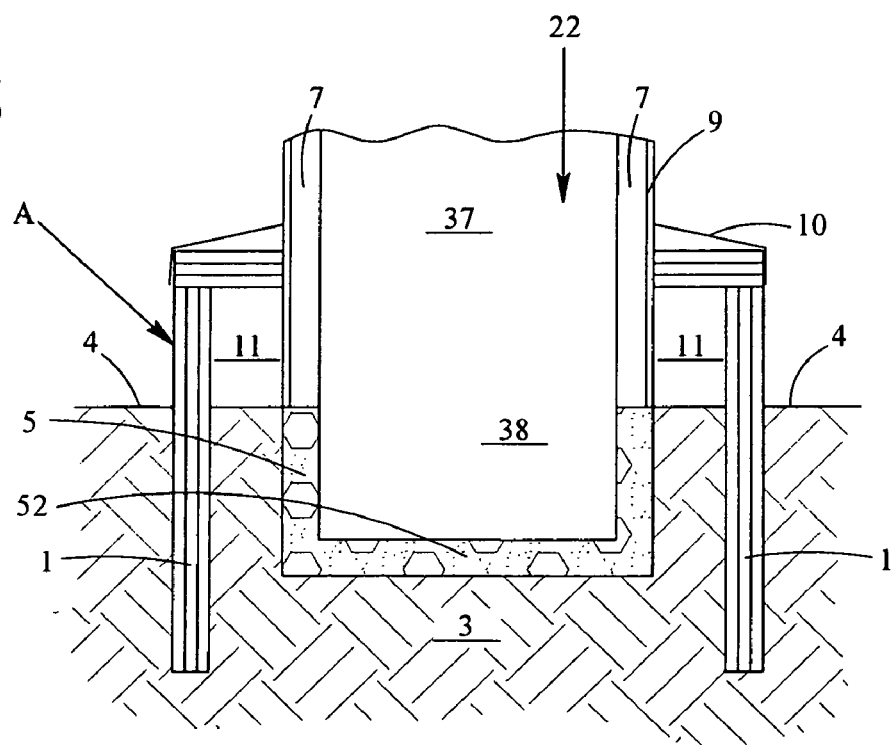
FIG. 28 is a sectional view showing the state, in which an insulating wall is constructed at a location spaced from an underground structure utilizing geothermal energy.
Figure 29:
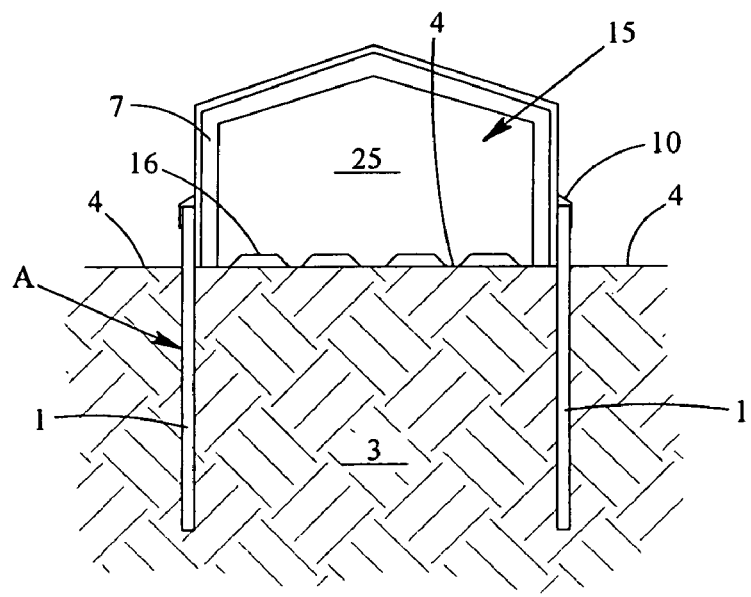
FIG. 29 is a sectional view showing the state, in which an insulating wall is constructed in close contact with a vinyl house.
Figure 30:
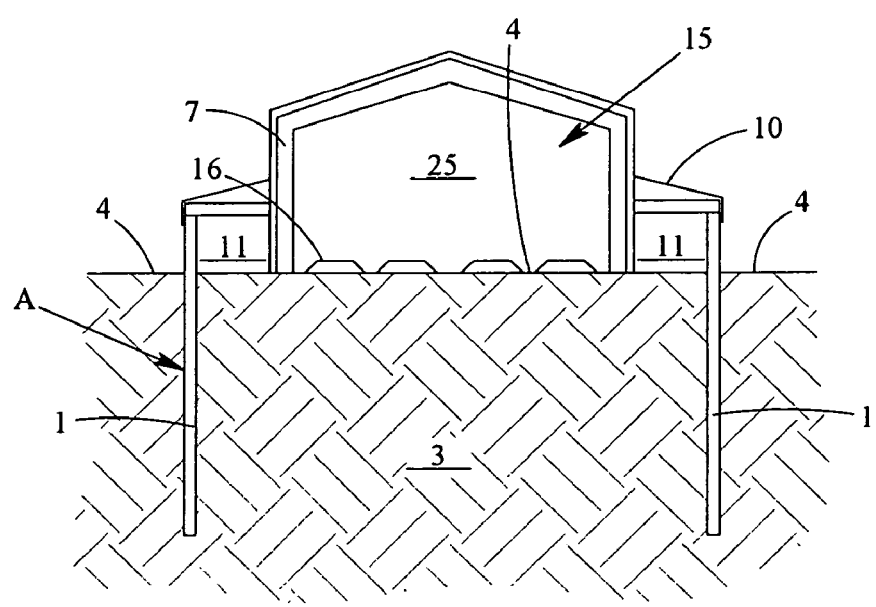
FIG. 30 is a sectional view showing the state, in which an insulating wall is constructed at a location spaced from a vinyl house.

The present invention can also be applied to the simple building 22 having no building foundation. In the building 22 which is simplified to have only a building upper portion 37 with no building foundation by erecting pillars 7 and 7 on the earth floor 14, for example, the insulating wall A is constructed by burying the insulation panels 1 in close contact with the outer wall 9, as shown in FIG. 25. In this case, too, the insulating wall A may be spaced from the outer wall 9 by forming the closed space 11, as shown in FIG. 26. For the building 22 having the continuous building foundation 5 to construct a basement 38, moreover, the insulating wall A of the present invention can be constructed, as shown in FIG. 27 and FIG. 28. In addition, the present invention can be applied like above to a vinyl house 15 having ridges 16 inside a house 25, as shown in FIG. 29 and FIG. 30.

Here will be described the specific actions of the present invention. FIG. 31 to FIG. 34 show an example using the building 22 of an ordinary house, and FIG. 35 to FIG. 38 show an example using the vinyl house 15.

Figure 31:
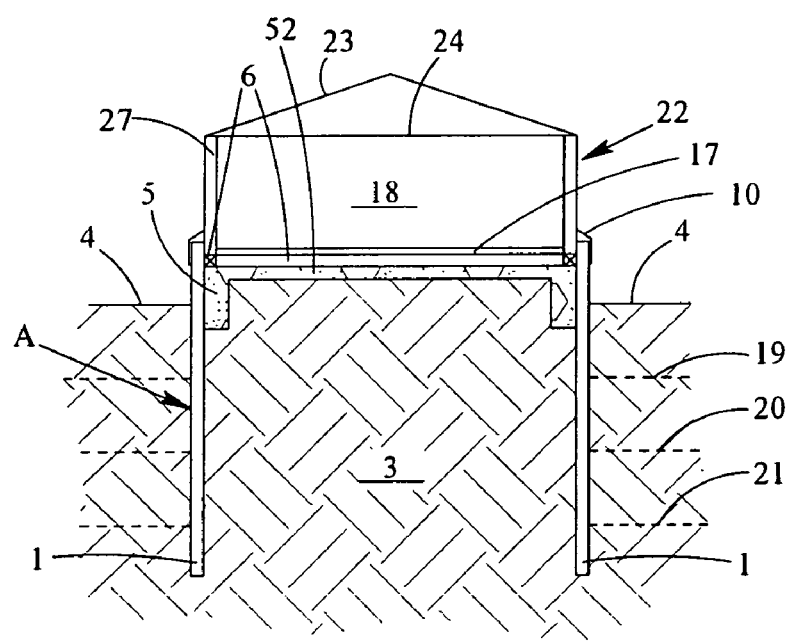
FIG. 31 is a sectional view showing a relation between an insulating wall and underground temperature distributions.

In the example shown in FIG. 31, the sills 6 are mounted on the building foundation 5 having the underground beams 52, and an interior 18 surrounded by a floor 17, a building wall 27 and a ceiling 24 is constructed, so that the building 22 having a roof 23 is erected. The insulating wall A is constructed by burying the insulation panels 1 in the ground 3 while closely contacting with the building foundation 5, such that the insulation panels 1 reach a layer 21 of 3 m depth (or the underground constant temperature layer) from the ground surface 4 through a layer 19 of 1 m depth and a layer 20 of 2 m depth. The insulating wall A is closed at its upper end with the water drip 10 as in the aforementioned individual examples.

Figure 32:
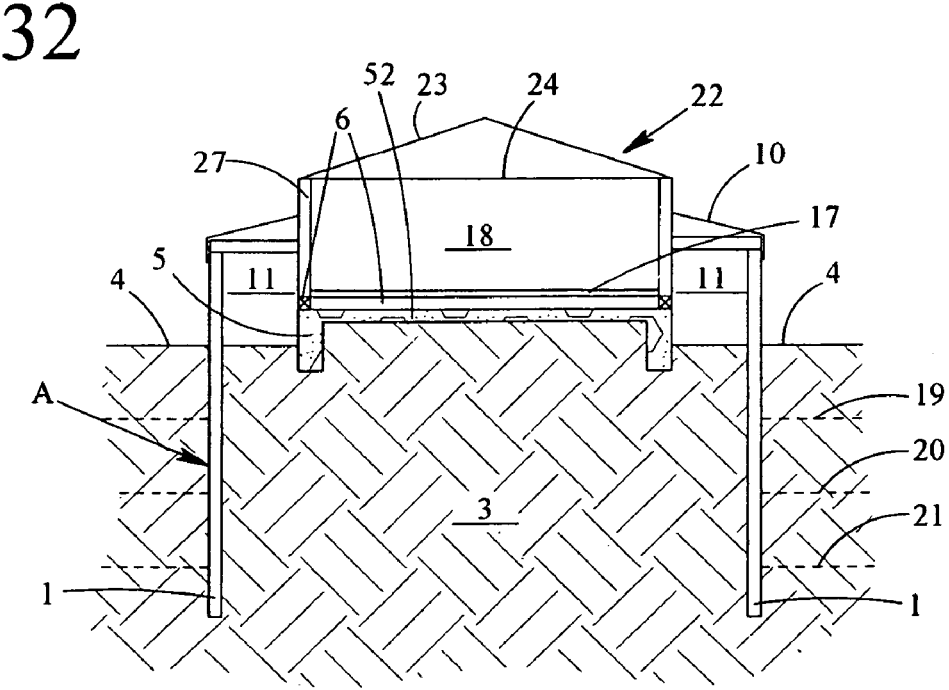
FIG. 32 is a sectional view of another example showing a relation between an insulating wall and underground temperature distributions.

The insulating wall A shields the heat exchanges between the surroundings of the building 22 in the ground 3 and the 1 m depth layer 19, the 2 m depth layer 20 and the 3 m depth layer (or the underground constant temperature layer) 21, as surrounded by the insulating wall A, just under the building 22. As a result, the interior 18 performs the heat exchanges with the 3 m depth layer (or the underground constant temperature layer) 21 through the 1 m depth layer 19 and the 2 m depth layer 20. Specifically, the interior 18 is cooled in summer by the heat exchanges with the 3 m depth layer (or the underground constant temperature layer) 21 having a lower temperature than that of the outside air, and is warmed in winter by the heat exchanges with the 3 m depth layer (or the underground constant temperature layer) 21 having a higher temperature than that of the outside air, so that the external (electric or gas) energies required for cooling or warming the interior 18 can be reduced. In this case, it is advisable for suppressing the heat exchanging loss at the portion separating the interior 18 and the 1 m depth layer that the floor 17, the sills 6 and the underground beams 52 are held in close contact with each other, as seen in this example (FIG. 31). Further, in order to suppress the affections of the heat exchanges of the ground exposed portion of the building foundation 5 with the outside air, it is advisable that the insulation panels 1 are buried while leaving the closed space 11 from the building foundation 5, as shown in FIG. 32.

Figure 33:
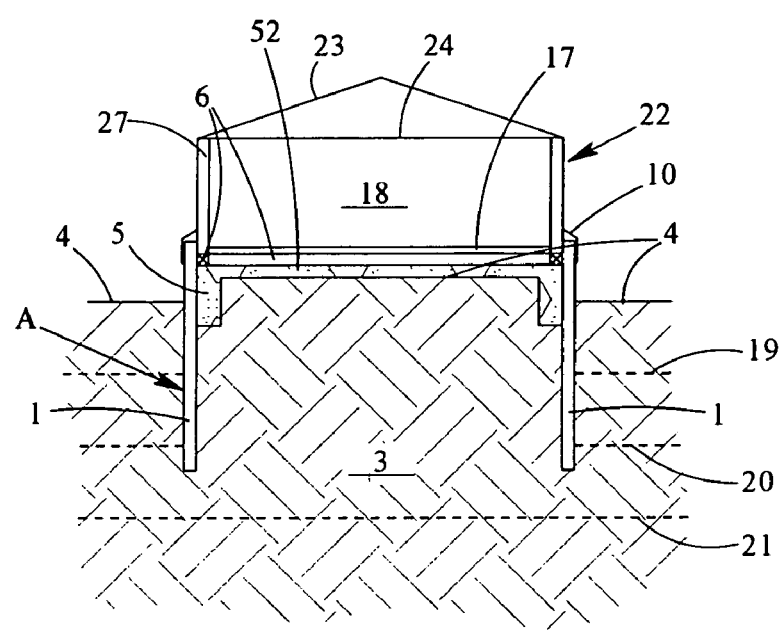
FIG. 33 is a sectional view of another example showing a relation between an insulating wall and underground temperature distributions.
Figure 34:
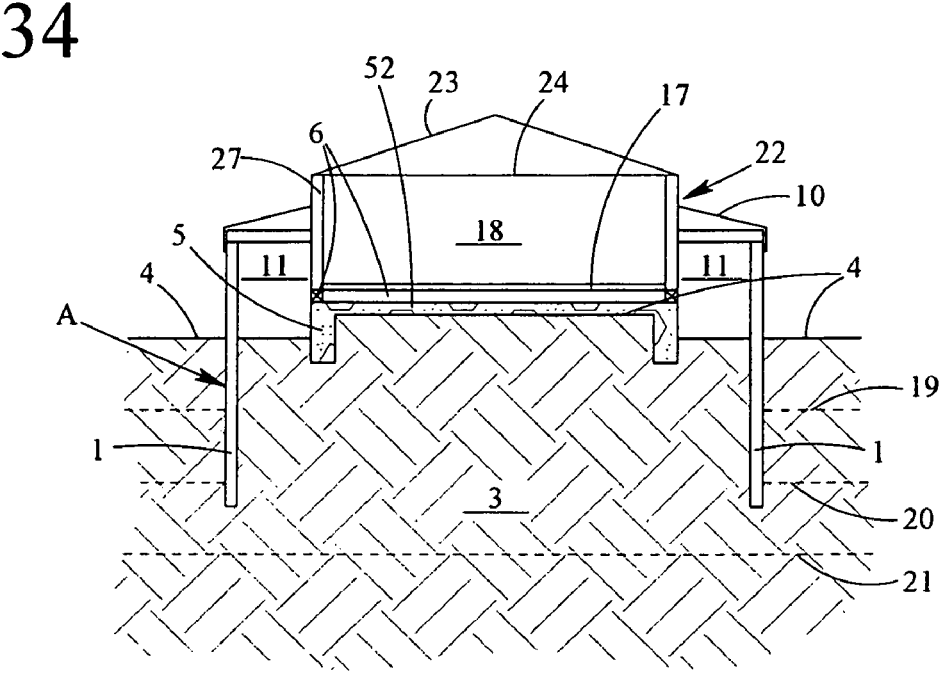
FIG. 34 is a sectional view of another example showing a relation between an insulating wall and underground temperature distributions.
Figure 35:
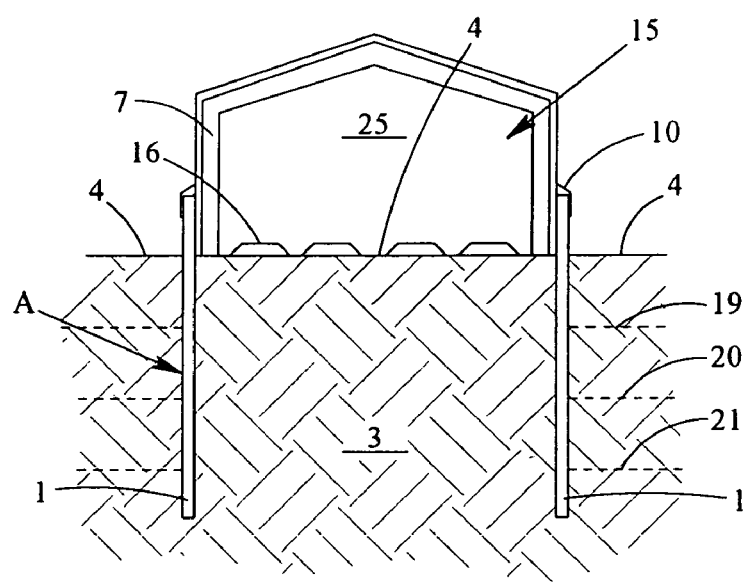
FIG. 35 is a sectional view of another example showing a relation between an insulating wall and underground temperature distributions.
Figure 36:
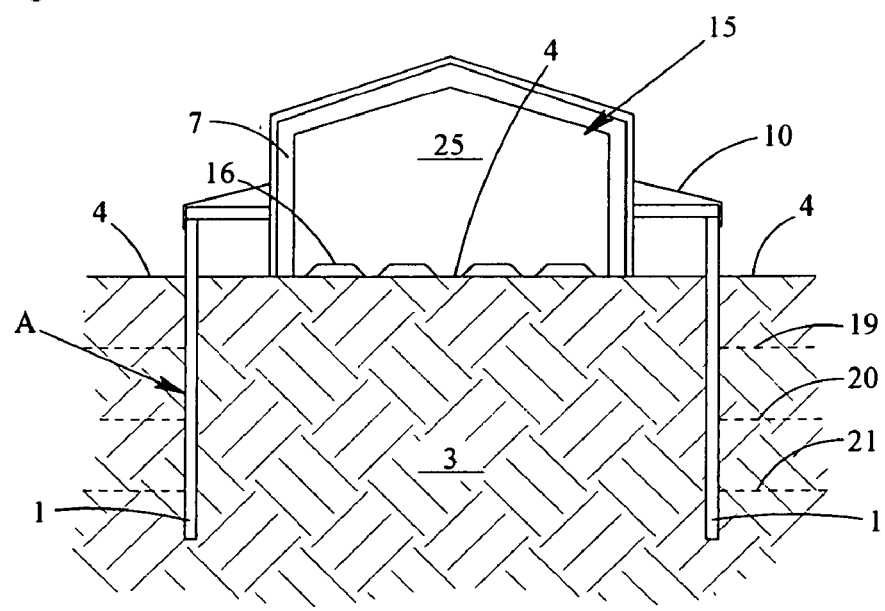
FIG. 36 is a sectional view of another example showing a relation between an insulating wall and underground temperature distributions.
Figure 37:
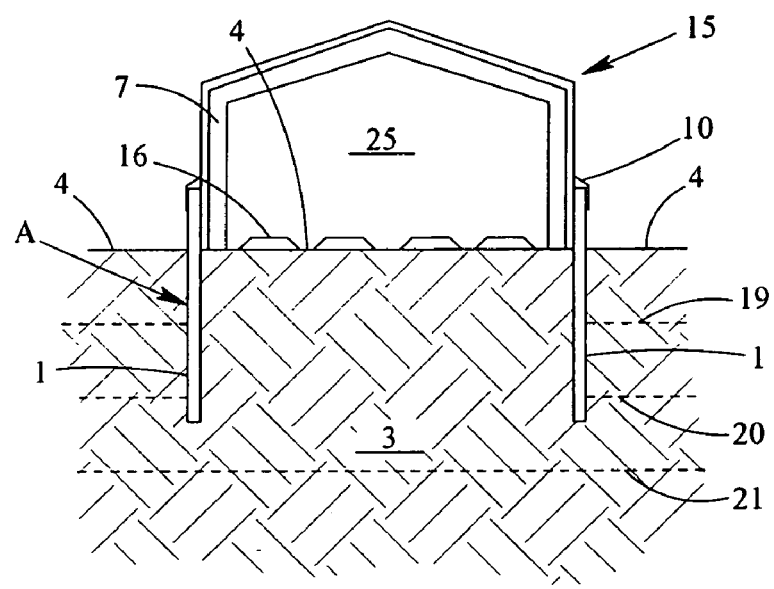
FIG. 37 is a sectional view of another example showing a relation between an insulating wall and underground temperature distributions.
Figure 38:
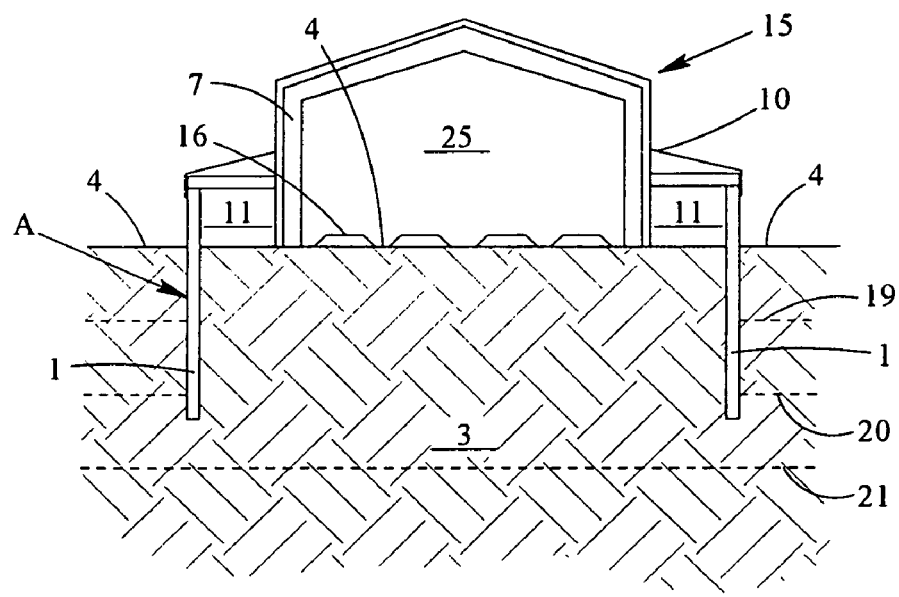
FIG. 38 is a sectional view of another example showing a relation between an insulating wall and underground temperature distributions.

By thus shielding the heat exchanges between the ground surround the building and the ground just under the building, the insulating wall A is intended to cool or warm the interior by the heat exchanges between the interior and the underground constant temperature layer, which takes a lower temperature (in summer) and a higher temperature (in winter) than that of the interior. Basically, as the insulating wall A buried is the deeper, therefore, it is the more preferable. If the aforementioned actions are realized, however, the burying depth of the insulating wall A may be smaller. As shown in FIG. 33 or FIG. 34, for example, it is sufficient that the insulating wall A is so shallow as to reach the 2 m depth layer 20.

Moreover, the aforementioned actions of the insulating wall A are realized at least by burying the insulation panels around the building. Even if the building is replaced by the vinyl house 15, as shown in FIG. 35, FIG. 36, FIG. 37 and FIG. 38, therefore, the actions of the insulating wall A reach the house interior 25. As a result, the external energy necessary for keeping the temperature of the house interior 25 is reduced to provide an effect that the vinyl house 15 can be utilized at a lower cost than that of the related art.

Figure 39:
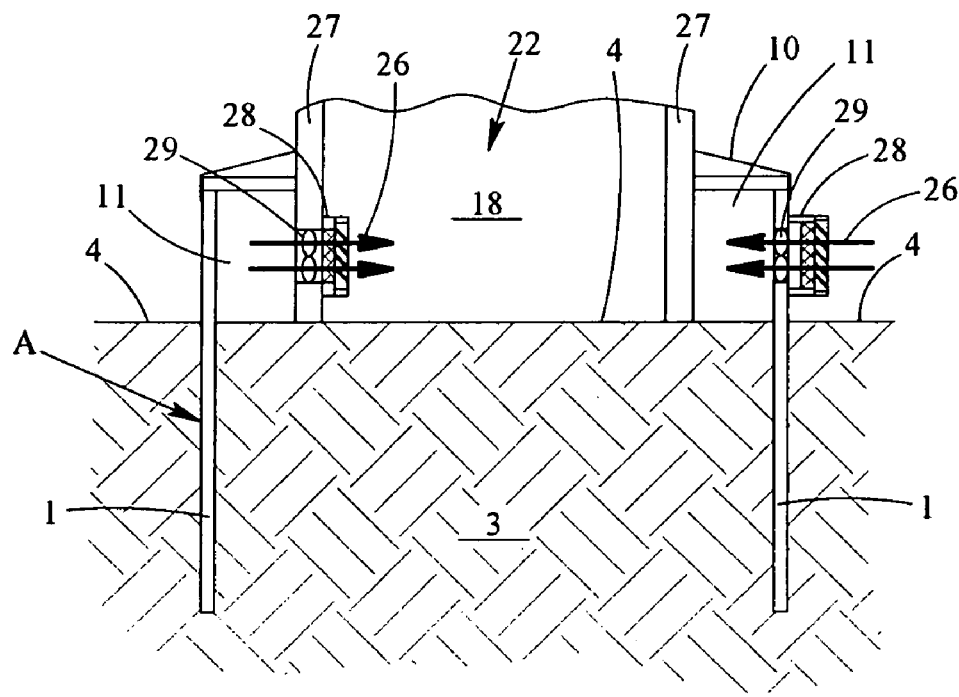
FIG. 39 is a sectional view showing the state, in which the outside air is introduced via a closed space between a building and an insulating wall.
Figure 40:
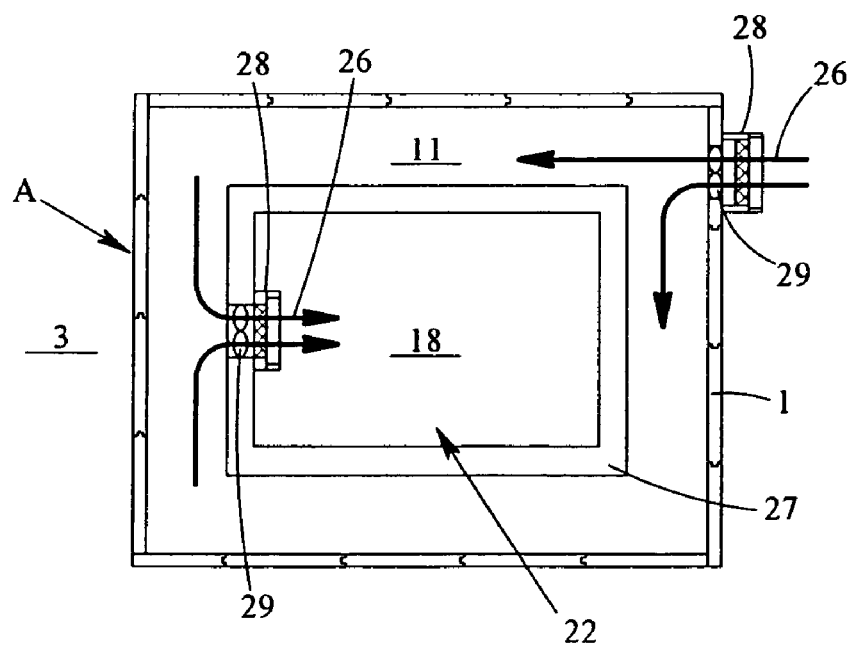
FIG. 40 is a top plan view showing the state, in which the outside air is introduced via a closed space between a building and an insulating wall.
Figure 41:
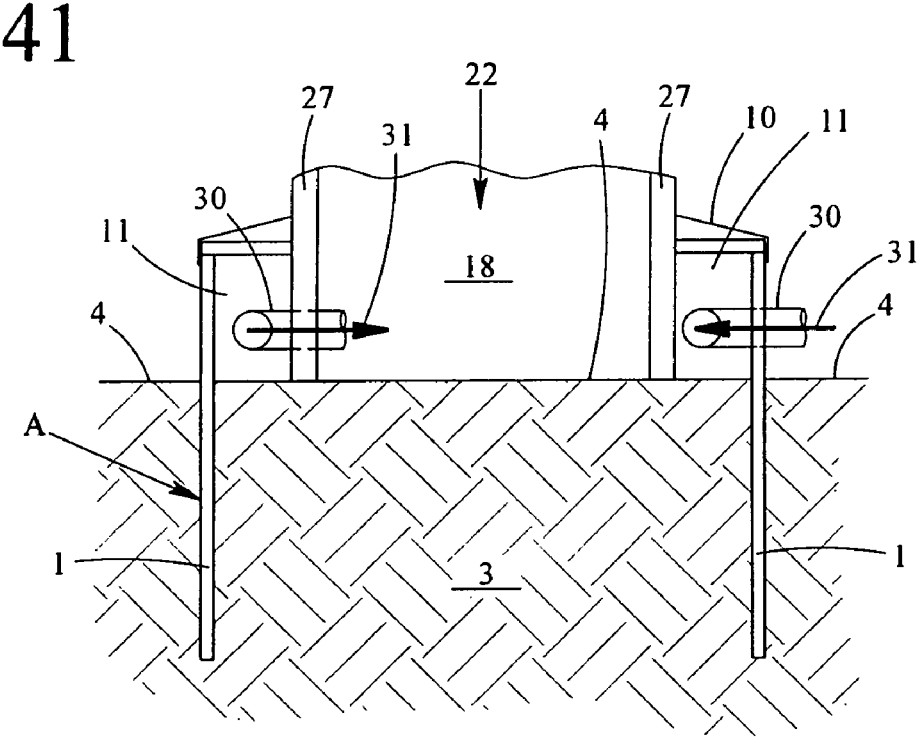
FIG. 41 is a sectional view showing the state, in which supplementary air-conditioning facilities are utilized through a closed space between a building and an insulating wall.
Figure 42:
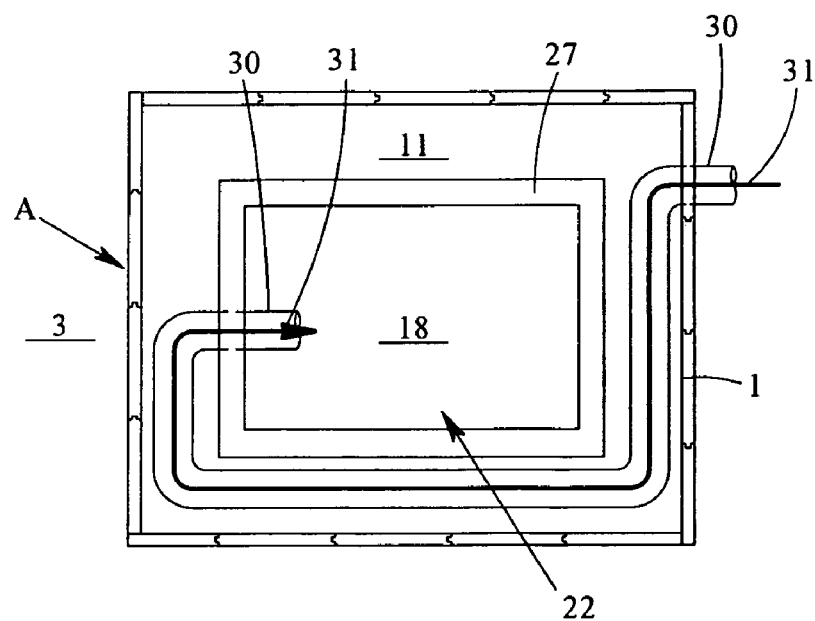
FIG. 42 is a top plan view showing the state, in which supplementary air-conditioning facilities are utilized through a closed space between a building and an insulating wall.

In the case of the examples thus far made, in which the closed space is formed between the building or the building foundation and the insulating wall, the actions of the insulating wall extend so long as to reach the aforementioned closed space. In case the interior 18 is to be ventilated, therefore, the outside air 26 is taken not directly but after it is cooled (in summer) or warmed (in winter) through the closed space 11, as shown in FIG. 39 and FIG. 40. In the example of FIG. 39, air cleaners 28 and ventilators 29 are arranged in the insulating wall A and the building wall 27 at the symmetric positions so that the outside air 26 may be taken in the interior 18 through the closed space 11.

Utilizing that a cooling (in summer) or warming (in winter) effect at a constant level can be expected by the passage through the closed space 11, moreover, a duct 30 for passing the heat transfer medium (e.g., air, water or another air-conditioning medium) of the supplementary air-conditioning facilities may be extended through the closed space 11 from the outside of the insulating wall A to the interior 18. As a result, in summer, for example, the temperature rise of the cooling medium through the duct 30 is suppressed so that the supplementary cooler can be utilized with a small loss. In winter, too, the temperature fall of the heating medium is suppressed so that the supplementary heater can be utilized with a small loss.

Figure 43:
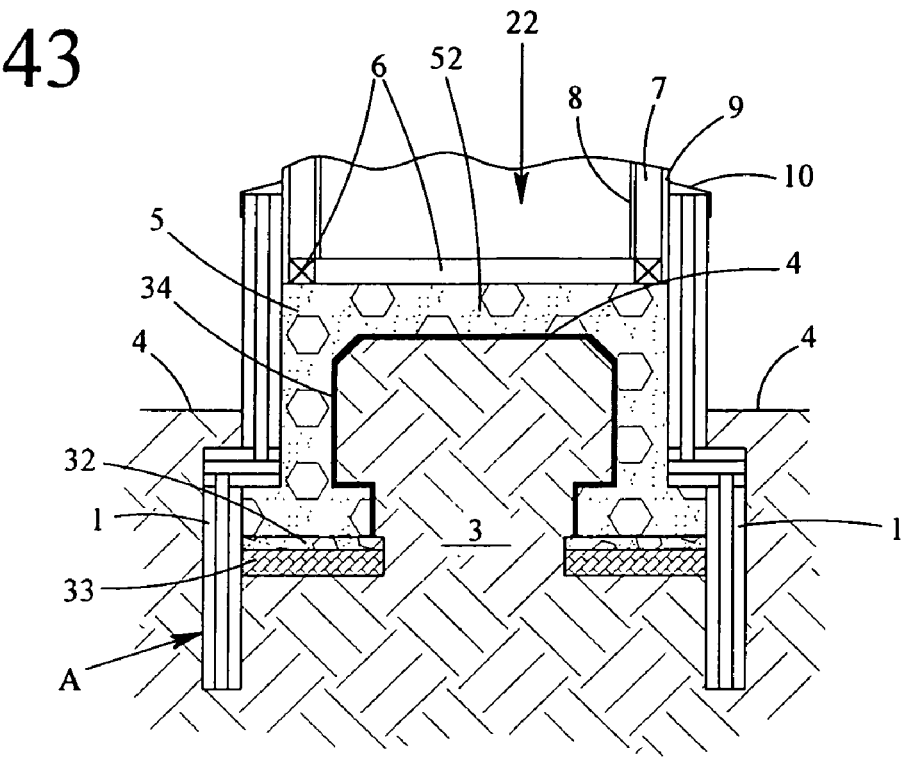
FIG. 43 is a sectional view showing a more practical example of the present invention.
Figure 44:
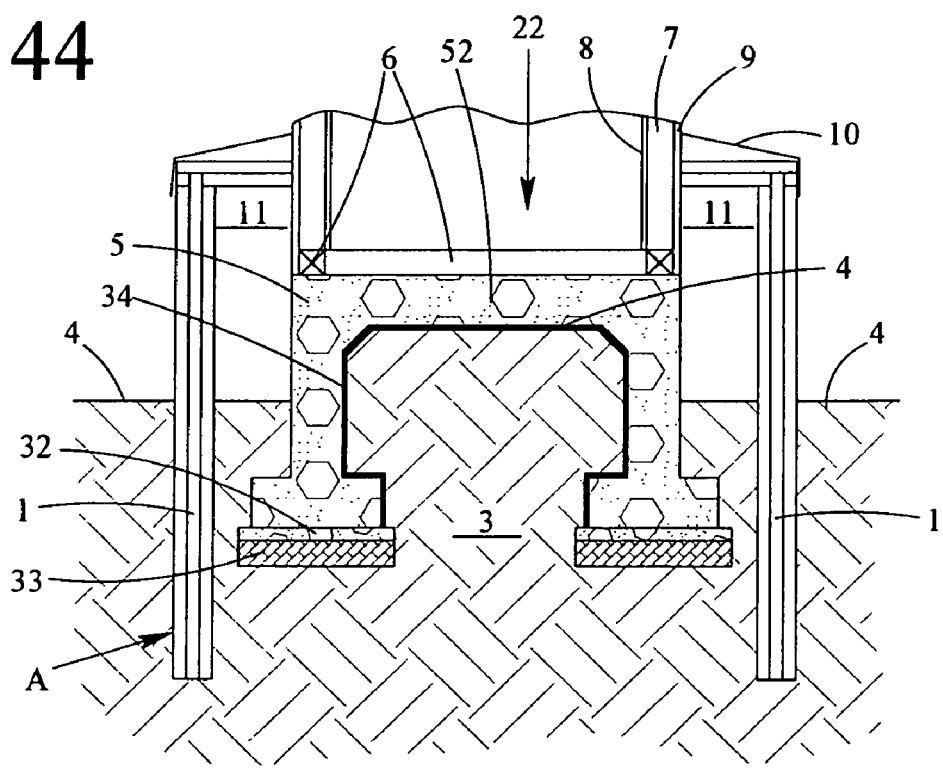
FIG. 44 is a sectional view showing another more practical example of the present invention.
Figure 45:
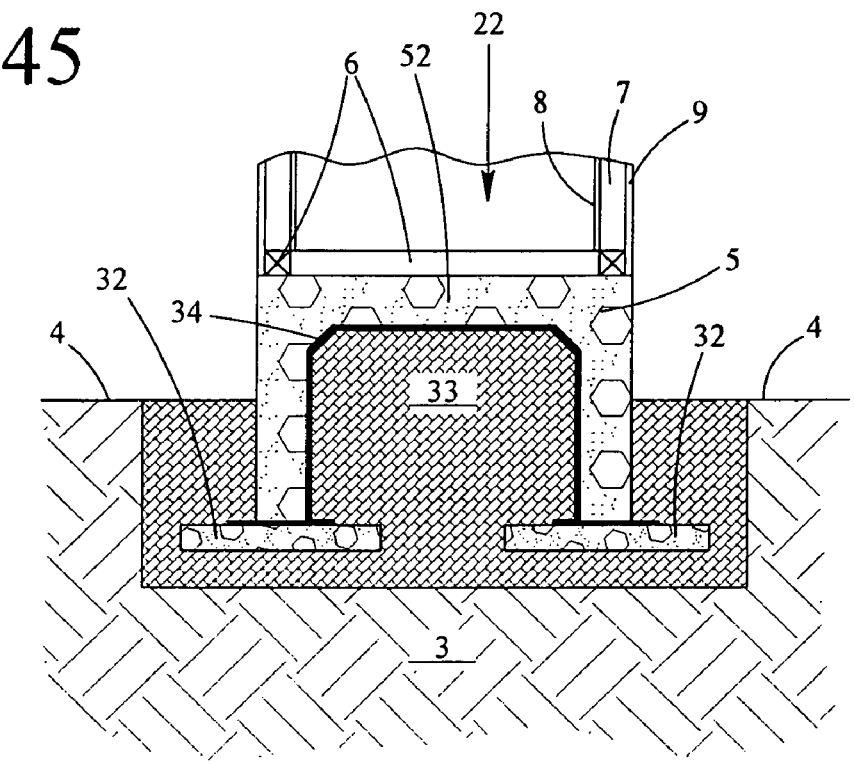
FIG. 45 is a sectional view of a building having a quakeproof structure.
Figure 46:
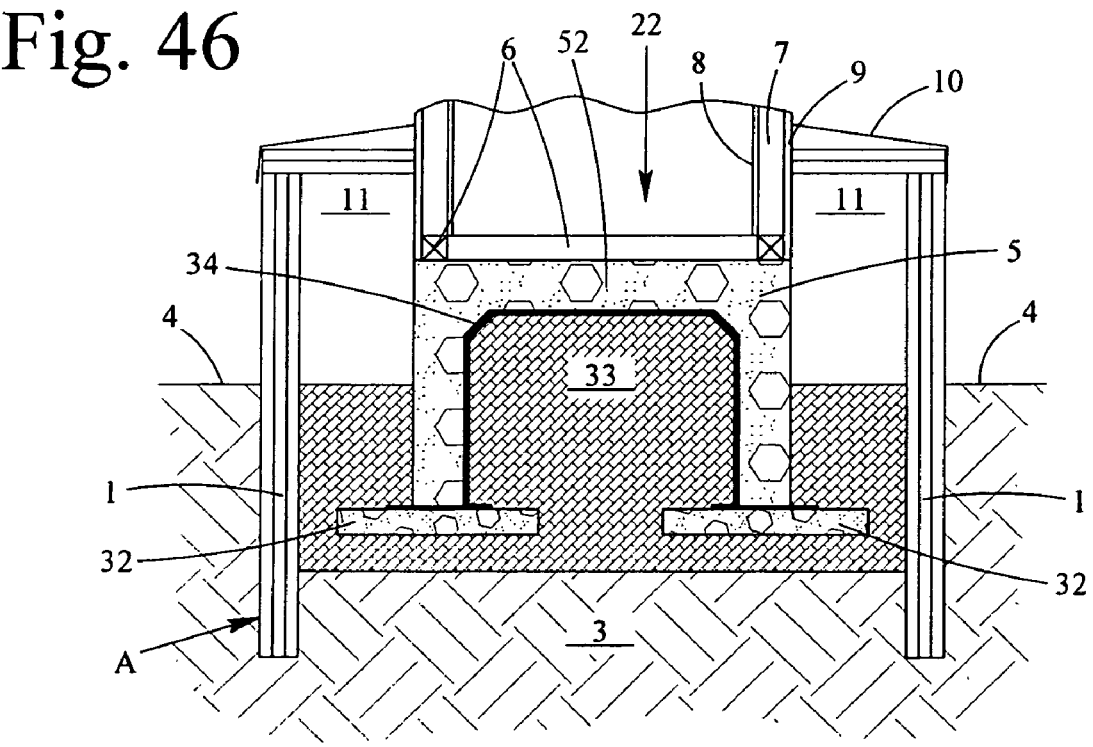
FIG. 46 is a sectional view of a building having a quakeproof structure, to which the present invention is applied.
Figure 47:
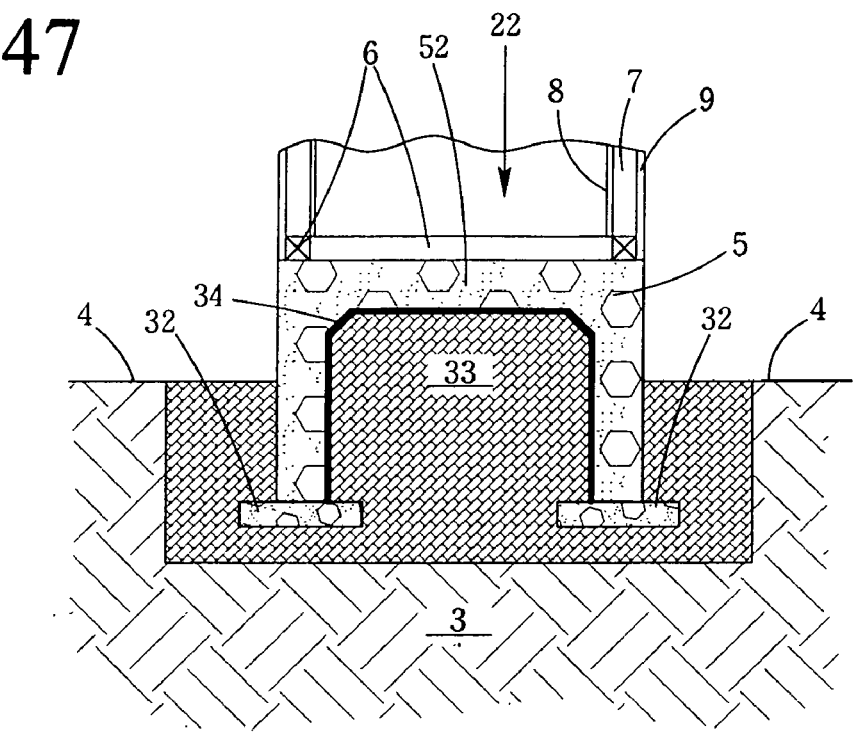
FIG. 47 is a sectional view of a building having a quakeproof structure of another example.
Figure 48:
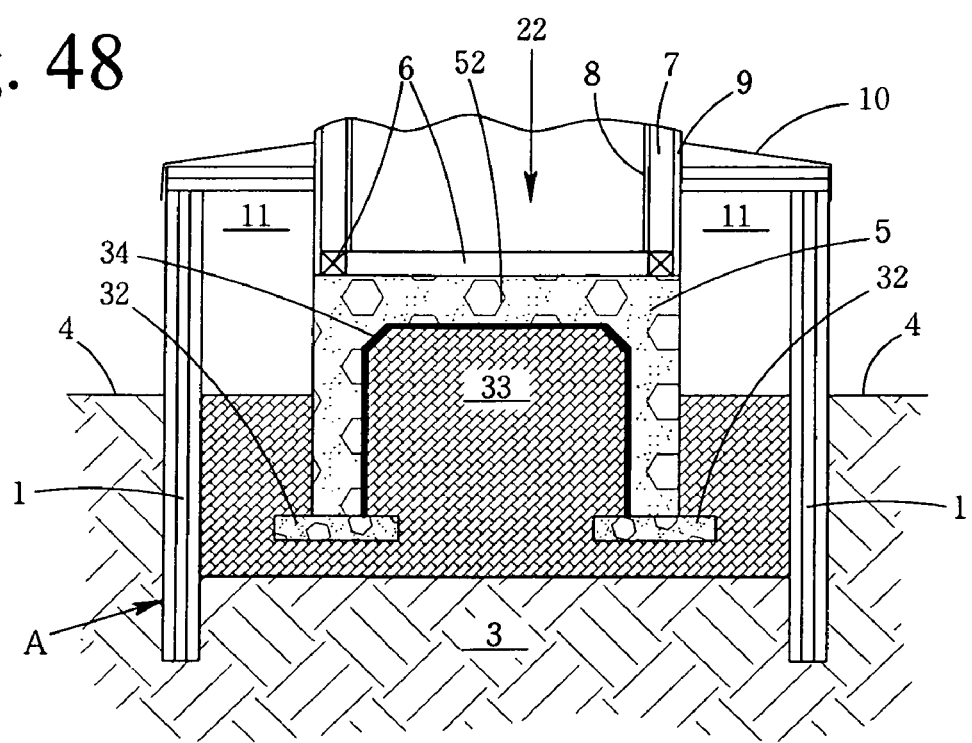
FIG. 48 is a sectional view of a building having quakeproof structure of another example, to which the present invention is applied.

In case the present invention is applied to the more practical building 22, the insulating wall A is desired to reach a depth over rubbles 33, because the building foundation 5 is constructed, as shown in FIG. 43 and FIG. 44, by paving the rubbles 33 at first and then by placing building foundation concrete 32. In case the present invention is applied to the building 22 having a quakeproof structure, in which a packed bed of the rubbles 33 is formed to surround the building foundation concrete 32 and the building foundation 5 and to fill the range up to the underground beams 52, as shown in FIG. 45, moreover, it is advisable that the insulating wall A is constructed to surround the aforementioned packed bed of the rubbles 33 and to reach the ground 3 deeper than that packed bed, as shown in FIG. 46. The invention can also be applied, as shown in FIG. 48, to the building 22 of the quakeproof structure of this example (FIG. 47), in which a moisture proof sheet 34 is arranged between the building foundation concrete 32 and the building foundation 5 and along the lower faces of the underground beams 52.

Figure 49:
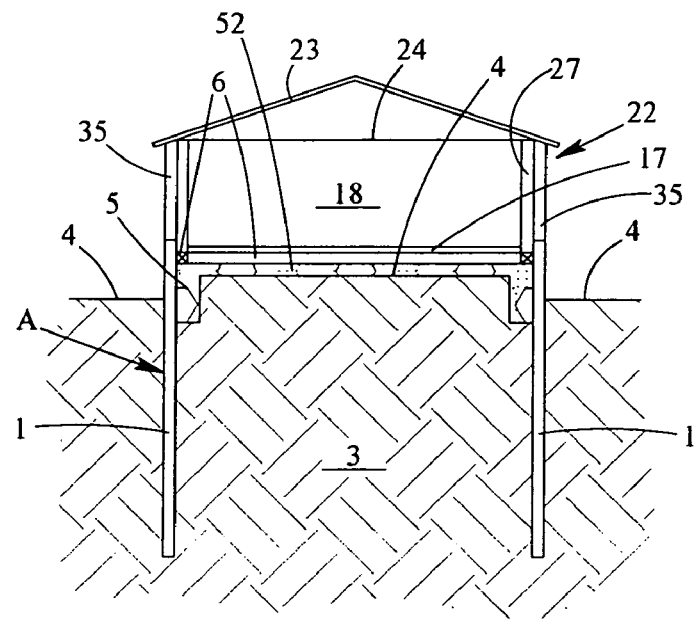
FIG. 49 is a sectional view showing an example, in which the insulating wall is extended along an outer wall of the building.
Figure 50:
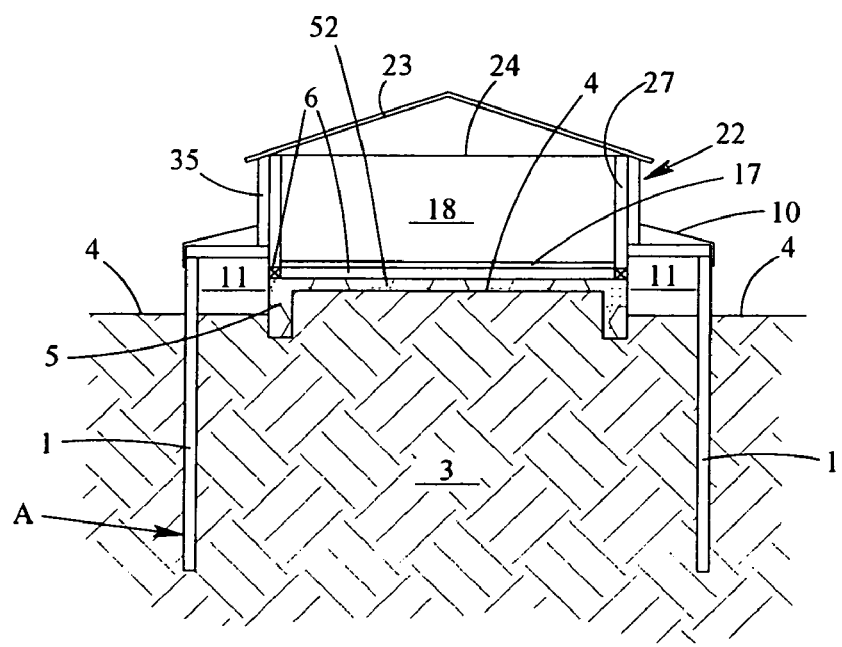
FIG. 50 is a sectional view showing another example, in which the insulating wall is extended along an outer wall of the building.
Figure 51:
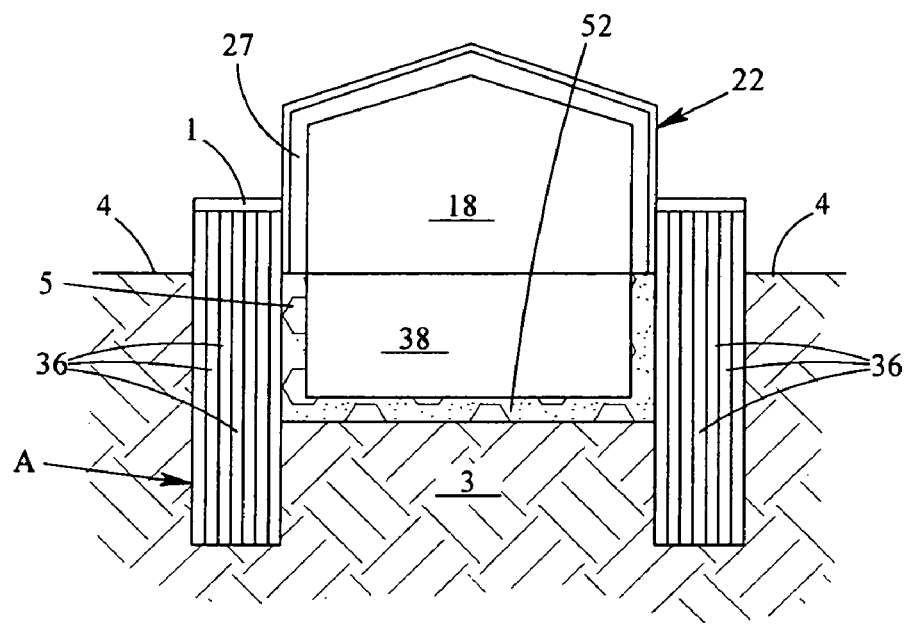
FIG. 51 is a sectional view showing an insulating wall composed of hollow pipes.
Figure 52:
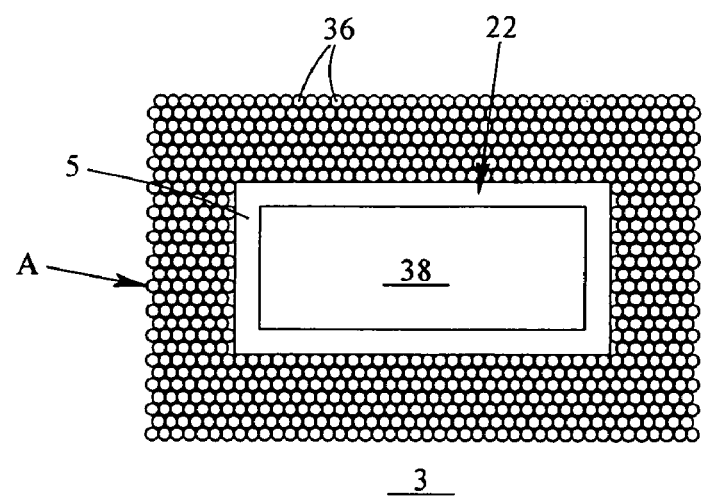
FIG. 52 is a top plan view showing the insulating wall composed of the hollow pipes.
Figure 53:
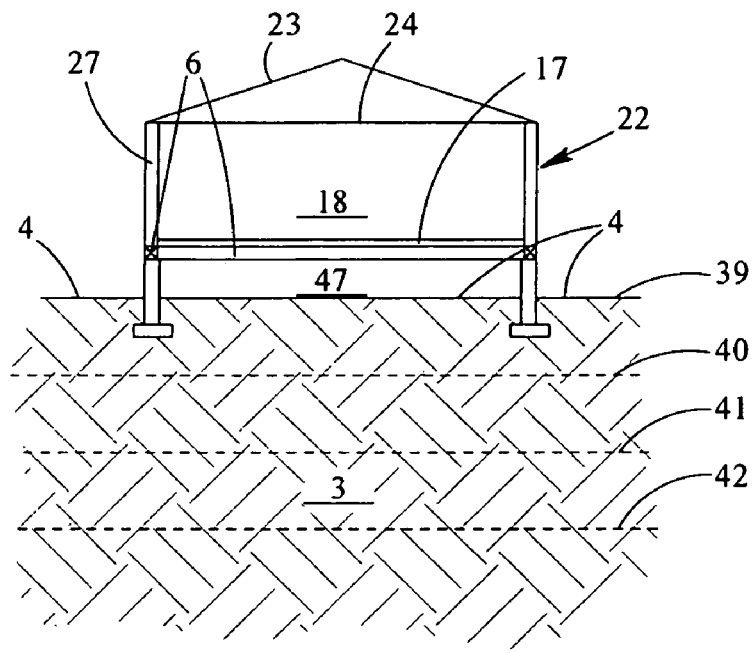
FIG. 53 is a sectional view showing an underground temperature distribution band at Hiroshima in winter.
Figure 54:
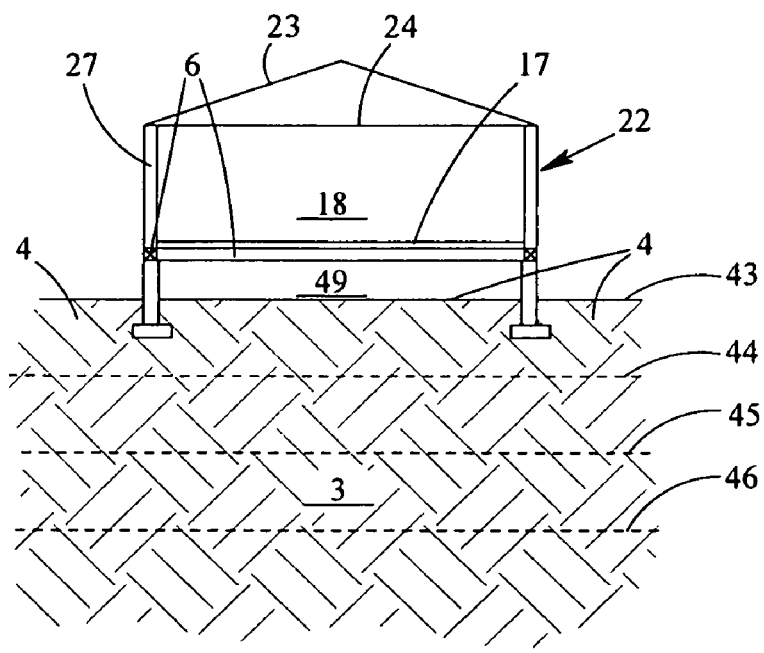
FIG. 54 is a sectional view showing an underground temperature distribution band at Hiroshima in summer.

In order to exercise actions and effects of the insulating wall of the present invention being better, it is advisable that the building exchanges the heat not directly with the outside air but exclusively with the underground constant temperature layer. As shown in FIG. 49 or FIG. 50, for example, the insulating wall A may be extended upward in its entirety by jointing upper insulation panels 35 to the insulating wall A, thereby to cover the side face of the building 22 wholly with the insulating wall A. As a result, the interior 18 can exchange the heat exclusively downward to the ground 3 so that better actions and effects of the case, in which the present invention is applied, can be exercised.

The insulating wall A of the invention is constructed most simply by using the insulation panels, but a variety of insulating walls A can be utilized, if they are constructed to exercise the heat insulation from the viewpoint of the actions to shield the heat exchanges. Above all, it is preferable that the insulating wall A is constructed by burying a large number of hollow pipes 36 in close contact with the building foundation 5 each other. The air layers in the hollow pipes A form the heat insulating layer so that the hollow pipes can be used as the insulating wall A of the present invention even if the heat exchanges by the close contacts of the hollow pipes 36 are balanced. This results in an advantage that hollow pipes made of metal or resin can be utilized for the insulating wall A of this example thereby to construct a structurally stronger insulating wall A than that of the aforementioned insulation panels.

INDUSTRIAL APPLICABILITY

According to the present invention, the air can be conditioned by utilizing the underground constant temperature layer while economizing in the external energies. Moreover, the present invention utilizes the transfer of thermal energies (or heat exchanges) for the heat balance between the interior and the underground constant temperature layer so that it is advantageous in no use of motive power and in no generation of vibrations or noises. Once the insulating wall A is constructed, moreover, what it needs is maintenances and managements like those of an ordinary building. Moreover, the heat source on one side for the heat exchanges is the underground constant temperature layer which is inexhaustible in fact. Therefore, another advantage is that the running cost is far lower than that utilizing another air conditioning facilities and that the run can be continued permanently.

The heat balance between the interior and the underground constant temperature layer converges into the state in which the thermal energies of the both become equivalent, so that the interior or the house interior and the underground constant temperature layer do not take an equal temperature. However, the interior takes relatively a lower temperature in summer than the exterior and a higher temperature in winter than the exterior. From the aforementioned Table 1, for example, the underground constant temperature layer (or the 3 m depth layer) in Hiroshima can be deemed to be 16 to 17° C. throughout a year, and this value is equal to the temperature of May or June. From this fact, a relatively comfortable interior can be provided without any air conditioning, if the interior temperature can be brought close to that of the underground constant temperature layer. This provision contributes not only to the health maintenance such as the suppression of stresses or the prevention of diseases but also to the stabilization and promotion of the growths of plants. The present invention is featured by such a point different from that of the energy utilization of the related art that those effects can be homogeneously given to the building or vinyl house as a whole.

In view of the situations of recent years, in which lives are supported on the basis of the consumptions of fossil energies such as petroleum, gases and coal, there have been continuously feared the problems of the reduction of resources or the global warming due to increases in the discharge of by-products such as $CO_2$ according to the energy consumptions. These fears hasten us to investigate, develop or introduce the utilizations of natural energies such as solar heat or light, wind power, water power or geothermal energy. Of these natural energies, the geothermal energy is advantageous in that it needs no motive power when utilized and can be constantly utilized for twenty-four hours. By utilizing these geothermal energies for air-conditioning the building, according to the present invention, the amount of fossil energies to be used for the conventional air-conditioning is drastically reduced to realize the energy conservation.

The invention claimed is:

1. A structure utilizing geothermal energy comprising an insulating wall buried in the ground while surrounding a foundation of a building, wherein said insulating wall extends down to a depth deeper than said building foundation integrally and continuously from the outer wall of the building so far as to reach the depth of an underground constant temperature layer, said insulating wall is buried at a location spaced from the outer side face of said building foundation, and said insulating wall is formed by a plurality of insulation panels made of a synthetic resin.

2. The structure utilizing geothermal energy according to claim 1, wherein an inner ventilator is mounted in said ground exposed portion or in a wall of the building for providing the communicative connection between inside of the building and a close space formed at said location between said ground exposed portion of the building foundation and said insulating wall; and an outer ventilator is mounted in said insulating wall for providing the communicative connection between said closed space and the outside of the structure.

3. The structure utilizing geothermal energy according to claim 1, wherein a bottom face of said building contacts directly with the ground surface in the area surrounded by said insulating wall.

4. The structure utilizing geothermal energy according to claim 1, wherein rubbles are filled between said bottom face of the building and said ground surface in the area surrounded by said insulating wall.

5. The structure utilizing geothermal energy according to claim 1, wherein said rubles are filled between said mat foundation constructing a portion or a whole of said bottom face and said ground surface in the area surrounded by said insulating wall.

6. The structure utilizing geothermal energy according to claim 1, wherein a plurality of a moisture permeable holes are formed in a section of said insulation panel for providing the communicative connection between the inner side and the outer side of said insulating wall.

* * * * *